(12) United States Patent
Nishimura et al.

(10) Patent No.: US 10,322,344 B2
(45) Date of Patent: Jun. 18, 2019

(54) GAME CONTROL PROGRAM, GAME SYSTEM, AND GAME CONTROL METHOD FOR DISPLAYING REFERENCE INDICATOR AND TARGET INDICATOR

(71) Applicant: KONAMI DIGITAL ENTERTAINMENT CO., LTD., Tokyo (JP)

(72) Inventors: Yoshitaka Nishimura, Tokyo (JP); Masahiro Kiyomoto, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 490 days.

(21) Appl. No.: 15/067,486

(22) Filed: Mar. 11, 2016

(65) Prior Publication Data

US 2016/0193531 A1 Jul. 7, 2016

Related U.S. Application Data

(63) Continuation-in-part of application No. PCT/JP2014/074230, filed on Sep. 12, 2014.

(30) Foreign Application Priority Data

Sep. 18, 2013 (JP) .................................. 2013-193194

(51) Int. Cl.
*A63F 13/537* (2014.01)
*A63F 13/5372* (2014.01)
(Continued)

(52) U.S. Cl.
CPC ........ *A63F 13/537* (2014.09); *A63F 13/2145* (2014.09); *A63F 13/44* (2014.09); *A63F 13/5372* (2014.09); *A63F 13/814* (2014.09)

(58) Field of Classification Search
None
See application file for complete search history.

(56) References Cited

U.S. PATENT DOCUMENTS 6,225,547 B1 5/2001 Toyama et al.
2008/0139310 A1 6/2008 Kando et al.
(Continued)

FOREIGN PATENT DOCUMENTS

JP 2001-096061 A 4/2001
JP 2008-142181 A 6/2008
(Continued)

OTHER PUBLICATIONS

Communication dated Jun. 20, 2018 from the State Intellectual Property Office of the P.R.C. in counterpart Application No. 201480048854.5.
(Continued)

*Primary Examiner* — Robert T Clarke, Jr.
(74) *Attorney, Agent, or Firm* — Sughrue Mion, PLLC

(57) ABSTRACT

A game method is performed by one or more computers. The method may include, but is not limited to: displaying, on a display, 1) at least one reference indicator; 2) at least one target indicator; and 3) at least one operation indicator; recognizing, as the specific operation, a detected series of operations that an indictor gets contact with a predefined point of the detection area, before on the detection area the indicator slides while keeping the indicator in contact with the detection area; displaying, on the display, a guide indicator for guiding a slide-operational direction to which the indicator is operated to be slide; determining whether the specific operation responsive to the change of the cross position; and reflecting a result of the determination to a game result.

17 Claims, 20 Drawing Sheets

(51) Int. Cl.
*A63F 13/814* (2014.01)
*A63F 13/2145* (2014.01)
*A63F 13/44* (2014.01)

(56) References Cited

U.S. PATENT DOCUMENTS

| | | | | |
|---|---|---|---|---|
| 2011/0034247 A1* | 2/2011 | Masuda | ............... | G10H 1/342 463/35 |
| 2013/0053114 A1* | 2/2013 | Nishimura | ............ | A63F 13/814 463/7 |
| 2013/0130761 A1* | 5/2013 | Hayashi | ............... | A63F 13/005 463/7 |
| 2013/0130795 A1* | 5/2013 | Hayashi | ............... | A63F 13/537 463/31 |
| 2013/0201115 A1 | 8/2013 | Heubel | | |

FOREIGN PATENT DOCUMENTS

| | | |
|---|---|---|
| JP | 2013-042961 A | 3/2013 |
| JP | 2013-178759 A | 9/2013 |

OTHER PUBLICATIONS

Communication dated Jan. 31, 2018, from the Korean Intellectual Property Office in counterpart application No. 10-2016-7005153.

"The neighbor blog, the writer ***, the home made taste is the maximum~rhythm action game [TAP SONIC] tap sonic", https://blog.naver.com/hot79486/40132531898, Jun. 27, 2011, 13 pages total.

"The research institute, the operating system of the rhythm game at the touch interface", http://tophet.tistory.com/80, May 24, 2013, 10 pages total.

Communication dated Nov. 30, 2018 from the Korean Intellectual Property Office in application No. 10-2016-7005153.

Communication dated Jan. 21, 2019, from Korean Intellectual Property Office in counterpart application No. 10-2016-7005153.

Communication issued Feb. 20, 2019 by the State Intellectual Property Office of P. R. C. in application No. 201480048854.5.

* cited by examiner

US 10,322,344 B2

GAME CONTROL PROGRAM, GAME SYSTEM, AND GAME CONTROL METHOD FOR DISPLAYING REFERENCE INDICATOR AND TARGET INDICATOR

TECHNICAL FIELDS

The disclosure generally relates to a game control program, a game system, and a game control method.

BACKGROUNDS

Music games providing a guide to operation tuning are disclosed in Japanese Patent Application Publication No. 2001-96061. A note bar corresponding to rhythm sounds is displayed along a prescribed path, and in which, the note bar is moved toward a reference line so that the note bar responsive to the reference line corresponding to the current time at the operation time.

SUMMARY

In some embodiment, a game control program product may include, but is not limited to: a non-transitory computer-readable medium, and a computer program stored in the non-transitory computer-readable medium, the computer program being, when executed by a computer of a game system including a display for game screen and a defector configured to detect contact or touch to a detection area, to cause the computer to at least: display, on the display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to the detection area; recognize, as the specific operation, a detected series of operations that an indictor gets contact with a predefined point of the detection area, before on the detection area the indicator slides while keeping the indicator in contact with the detection area; display, on the display, a guide indicator for guiding a slide-operational direction to which the indicator is operated to be slide; determine whether the specific operation responsive to the change of the cross position; and reflect a result of the determination to a game result.

BRIEF DESCRIPTIONS OF THE DRAWINGS

DETAILED DESCRIPTIONS

Embodiments

Figure 1:
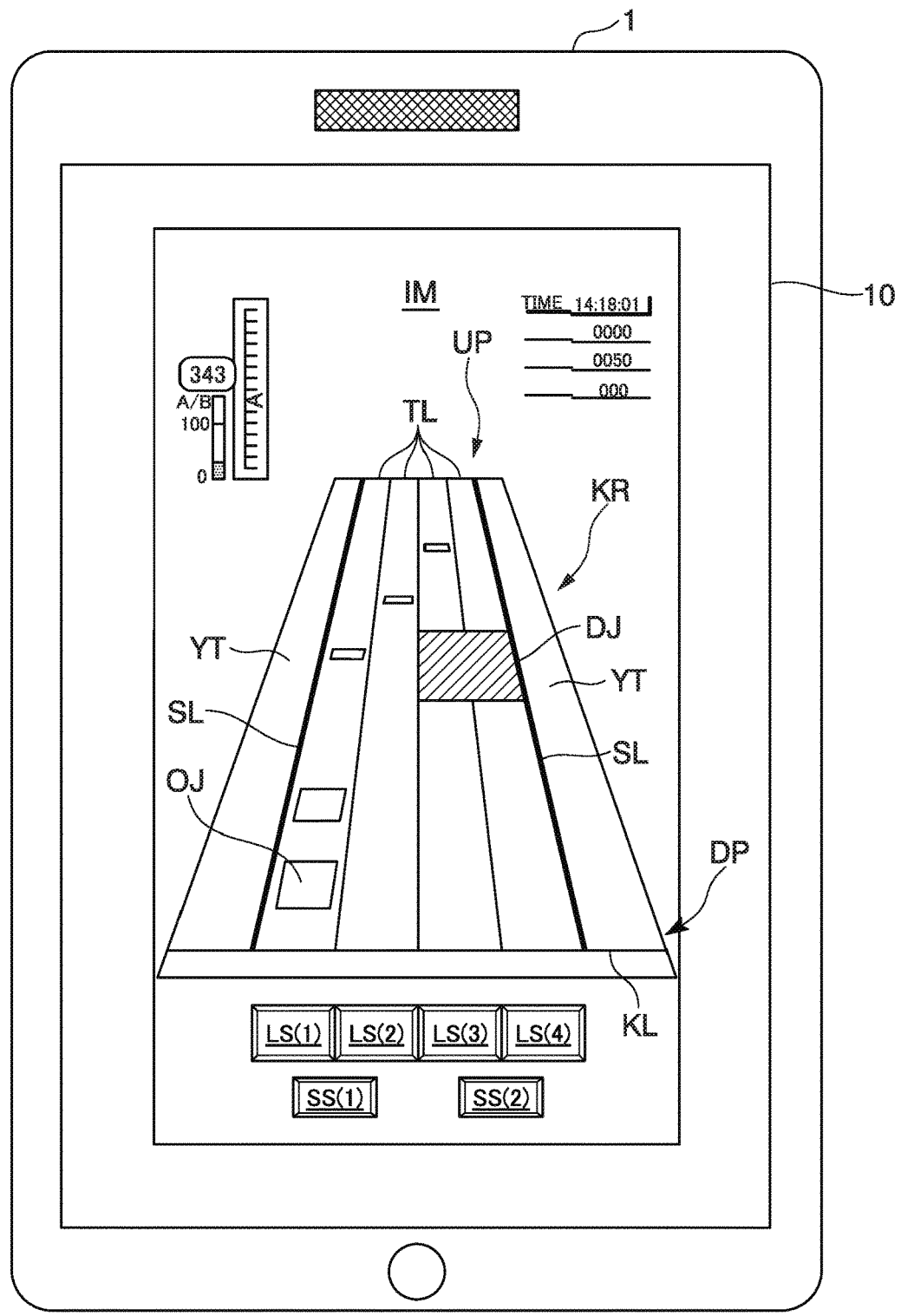
FIG. 1 shows the outer appearance of the game system according to the first embodiment and an example of a game screen displayed by the game system.

In some embodiment, a game control program product may include, but is not limited to: a non-transitory computer-readable medium, and a computer program stored in the non-transitory computer-readable medium, the computer program being, when executed by a computer of a game system including a display for game screen and a detector configured to detect contact or touch to a detection area, to cause the computer to at least: display, on the display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to the detection area; recognize, as the specific operation, a detected series of operations that an indictor gets contact with a predefined point of the detection area, before on the detection area the indicator slides while keeping the indicator in contact with the detection area; display, on the display, a guide indicator for guiding a slide-operational direction to which the indicator is operated to be slide; determine whether the specific operation responsive to the change of the cross position; and reflect a result of the determination to a game result.

In another embodiment, a game control program product may include, but is not limited to: a non-transitory computer-readable medium, and a computer program stored in the non-transitory computer-readable medium, the computer program being, when executed by a computer of a game system including a display for game screen and a detector configured to detect contact or touch to a detection area, to cause the computer to at least: display, on the display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to the detection area; recognize, as the specific operation, a detected operation that an indicator has been contacting continuously with a predefined point of the detection area for longer than a period of time; determine whether the specific operation responsive to the change of the cross position; and reflect a result of the determination to a game result.

In some cases, the computer program causes the game system further to: recognize, as a first operation to move the operation indicator in a first direction, a detected operation that the indicator has continuously been contacting with the predefined position of the detection area for longer than a period of time; and recognize, as a second operation to move the operation indicator in a second direction, a detected operation that the indicator has no longer contacted with the predefined position of the detection area after the indicator has continuously contacted.

In some cases, the computer program causes the game system further to: recognize, as a third operation to move the operation indicator faster than the first operation, a detected series of operations that an indicator gets contact with a predefined point of the detection area, before on the detection area the indicator slides while keeping the indicator in contact with the defection area.

In some embodiments, a game control program product may include, but is not limited to: a non-transitory computer-readable medium, and a computer program stored in the non-transitory computer-readable medium, the computer program being, when executed by a computer of a game system including a display for game screen and a detector configured to detect contact or touch to a detection area, to cause the computer to at least: display, on the display 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to the detection area; recognize, as the specific operation, a detected operation that an indicator has been following to and contacting with the cross position; determine whether the specific operation responsive to the change of the cross position; and change the position of the reference indicator over the game screen on the basis of the game result.

In some cases, the computer program causes the game system further to divide the detection area into a plurality of virtual divided areas, and associate operations on each of the plurality of virtual divided areas with a respective type of operations.

In some cases, the computer program causes the game system further to: display on the display the operation indicator corresponding to the cross position in case that it is determined that the specific operation recognized responsive to the change of the cross position.

In some cases, determining whether the specific operation responsive to the change of the cross position comprises: determining whether the specific operation detected on the detection area responsive to the change of the cross position on the basis of sequence data and contents of the specific operation detected on the detection area, where the sequence data describes contents of the specific operation detected on the detection area in playing a game on the game system, and the contents are associated with information specifying operation timing.

In some cases, determining whether the specific operation responsive to the change of the cross position may include determining that the specific operation detected on the detection area is responsive to the change of the cross position in case that the position of the operation indicator corresponds to the cross position.

In yet another embodiment, a game system may include, but is not limited to: a computer; a display for game screen; a detector configured to detect contact or touch to a detection area; and a computer program stored being, when executed by the computer to cause the computer to at least: display, on the display, 1) at least one reference indicator; 2) at least one target indicator; and 3) at least one operation indicator, wherein the target, indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to the detection area; recognize, as the specific operation, a detected series of operations that an indicator gets contact with a predefined point of the detection area, before on the detection area the indicator slides while keeping the indicator in contact with the detection area; display, on the display, a guide indicator for guiding a slide-operational direction to which the indicator is operated to be slide; determine whether the specific operation responsive to the change of the cross position; and reflect a result of the determination to a game result.

In still another embodiment, a game method is performed by one or more computers, the method may include, but is not limited to: displaying, on a display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to a detection area; recognizing, as the specific operation, a detected series of operations that an indicator gets contact with a predefined point of the detection area, before on the detection area the indicator slides while keeping the indicator in contact with the detection area;

displaying, on the display, a guide indicator for guiding a slide-operational direction to which the indicator is operated to be slide; determining whether the specific operation responsive to the change of the cross position; and reflecting a result of the determination to a game result.

In still another embodiment, a game system may include, but is not limited to: a computer; a display for game screen; a detector configured to detect contact or touch to a detection area; and a computer program stored being, when executed by the computer to cause the computer to at least: display, on the display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to the detection area; recognize, as the specific operation, a detected operation that an indicator has been contacting continuously with a predefined point of the detection area for longer than a period of time; determine whether the specific operation responsive to the change of the cross position; and reflect a result of the determination to a game result.

In still another embodiment, a game method is performed by one or more computers, the method may include, but is not limited to: displaying, on a display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to a detection area; recognizing, as the specific operation, a detected operation that an indicator has been contacting continuously with a predefined point of the detection area for longer than a period of time; determining whether the specific operation responsive to the change of the cross position; and reflecting a result of the determination to a game result.

In still another embodiment, a game system may include, but is not limited to: a computer; a display for game screen; a detector configured to detect contact or touch to a detection area; and a computer program stored being, when executed by the computer to cause the computer to at least: display, on the display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to the detection area; recognize, as the specific operation, a detected operation that an indicator has been following to and contacting with the cross position, determine whether the specific operation responsive to the change of the cross position; and change the position of the reference indicator over the game screen on the basis of the game result.

In still another embodiment, a game method is performed by one or more computers, the method may include, but is not limited to: displaying, on a display, 1) at least one reference indicator; 2) at least one target indicator; and 3) at least one operation indicator, wherein the target indicator decreasing in a distance from the reference indicator as time elapses, and after the target indicator has contacted with the reference indicator a cross position between the target indicator and the reference indicator changes continuously along an extension direction of the reference indicator, and wherein the operation indicator moves along the extension direction of the reference indicator on the basis of a specific operation to a detection area; recognizing, as the specific operation, a detected operation that an indictor has been following to and contacting with the cross position; determining whether the specific operation responsive to the change of the cross position; and changing the position of the reference indicator over the game screen on the basis of the game result.

Embodiments of a game control program, a game system, and a game control method will be described below, with references made to the drawings. A game system executing a game control program includes, for example, a device or group of devices having a contact sensing mechanism such as a touch panel. A mobile telephone, a tablet terminal, a personal computer, an arcade or home game machine, server devices or a group of such devices connected by communication is used as the hardware of the game system. The game system displays a game screen on a touch panel, and the game progresses in response to a user making touch operations on a touch panel, using a finger, a touch pen, or the like. A game provided by the game system, for example, plays back a melody selected by the user and moves various types of indicators from a departure position up to an arrival position (the reference line KL, to be described later), and the user needs to make prescribed operations at the timing point at which an indicator reaches the arrival position. The game score or the like is then determined, based on whether the prescribed operation was made with good timing. The timing at which an indicator reaches the arrival position is, for example, synchronized with the melody being played back, and the user can by himself or herself enjoy the feeling of providing the rhythm for the melody.

First Embodiment (General Description)

FIG. 1 shows the outer appearance of the game system 1 according to the first embodiment and an example of a game screen IM displayed by the game system 1. FIG. 1 shows an example in which the hardware of the game system 1 is a mobile telephone. As shown in the drawing, the game screen IM displayed by the touch panel 10 includes a path display area KR. The path display area KR includes four tracks TL as paths along which indicators flow and two spare tracks YT. In order to present a virtual three-dimensional space, the four tracks TL extend from one end of the screen, the deep (upper) side UP toward the other side of the screen, the forward (lower) side DP. The four tracks TL are disposed between two dividing lines SL, which extend from the deep end UP toward the toward end DP of the screen. Each of the four track TL responsive to one of four large buttons LS(1) to LS(4). Additionally, on the outside of each of the two dividing lines SL, a spare track YT is disposed, extending from the deep side UP to the forward side DP of the screen.

A reference line KL is disposed at the forward side DP of the path display area KR. The reference line KL is one example of reference indicator and extends in a straight line that crosses the four tracks TL and the two spate tracks YT from left to right. An object OJ, which is an indicator, is displayed at a pre-established timing on each of the tracks TL. An object OJ may start to be displayed at a random timing, rather than at a pre-established timing, and this applies as well to the other indicator described below. A large object DJ, which is an indicator, is displayed at a pre-established timing on the tracks TL. The large object DJ is disposed so as to straddle either the left-hand two tracks TL or the right-hand two tracks TL.

The objects OJ and the large objects DJ move from the deep side UP to the forward side DP of the tracks TL. The user needs to execute proper operations to match the arrival at the reference line KL of the objects OJ and the large objects DJ. Specifically, the user needs to tap or long-press a large button LS(1) to LS(4) corresponding to the track TL on which an object OJ is disposed, to match the arrival of the object OJ at the reference line KL. The user also needs to tap or long-press a small button SS(1) or SS(2) corresponding with the two tracks TL straddled by a large object DJ, to match the arrival of the large object DJ at the reference line KL. The offset between the user operation timing and the tuning of the arrival at object OJ or the large object DJ at the reference line KL is evaluated and reflected in the game score. The tap or long-press may be made by a user's finger or an implement such as a touch pen. In the following, these will be collectively referred to as an instructor.

In this case, the term tap indicates the continuation of a contact operation of quite a short duration, and the term long-press indicates a contact operation that is long in comparison with a tap operation. Whether the contacting operation with respect to the touch panel 10 is a tap or a long-press is made, for example, by judging a tap if the contacting time is shorter than a prescribed time and judging a long-press if the contacting time is longer than the pre-scribed time, which can be done by a known method.

Figure 2:
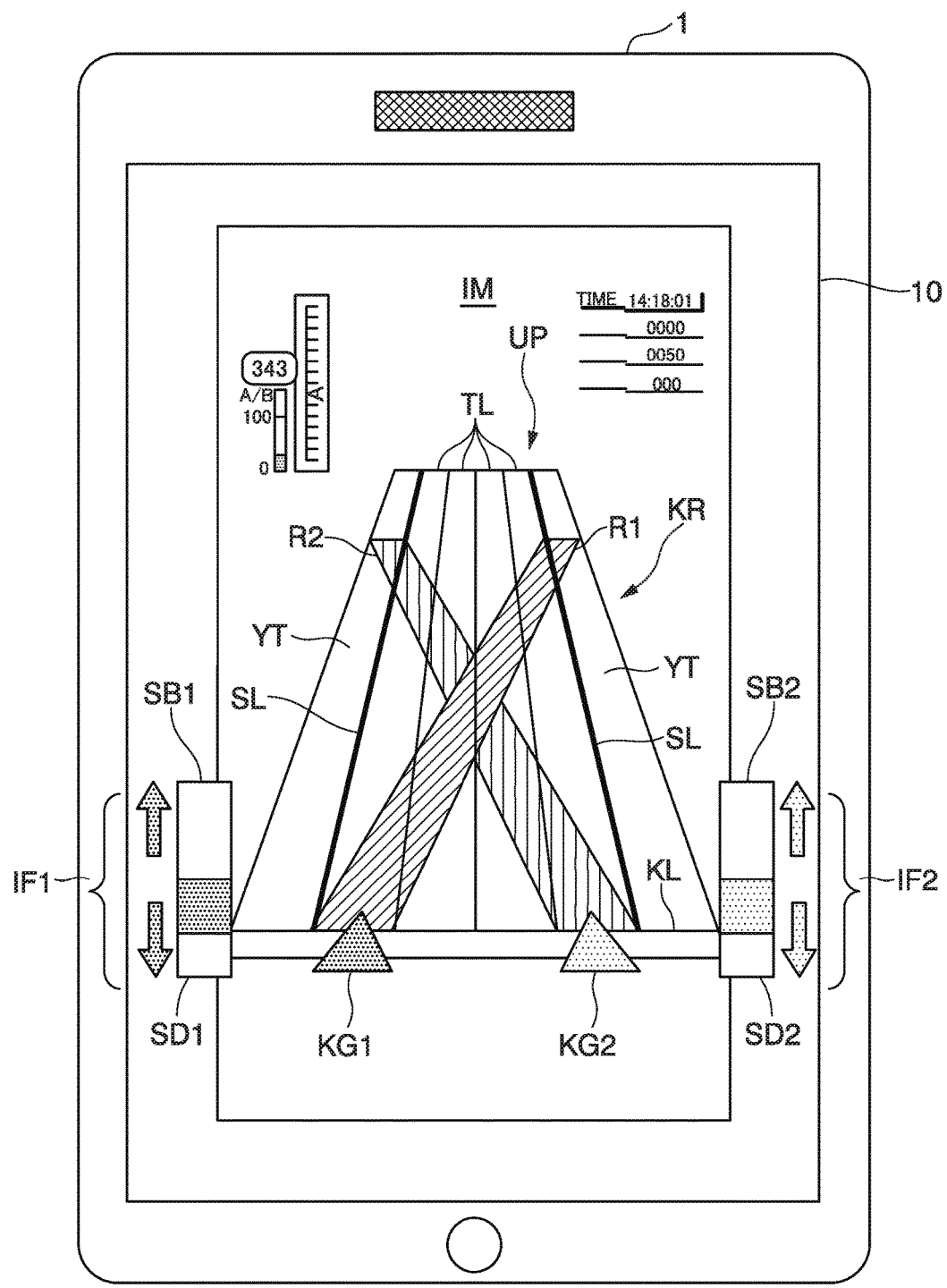
FIG. 2 shows another example, this being a game screen displayed by the game system according to the first embodiment.

FIG. 2 shows another example, this being a game screen IM displayed by the game system 1 according to the first embodiment. As shown in the drawing, the instruction paths R1 and R2, which are indicators, are displayed in the path display region KR at a pre-established timing. The instruction paths R1 and R2 are displayed with, for example, mutually different colors or effects to enable distinction by the user. The instruction paths R1 and R2 are examples of target indicators. The instruction paths R1 and R2 might intersect as shown in FIG. 2, or might, rather than intersect, each extend from the deep side UP to the forward side DP.

The instruction paths R1 and R2 are disposed within the regions of the spare tracks YT and the tracks TL. In the following, the instruction paths R1 and R2 might be referred simply as an instruction path R, without distinguishing therebetween. In FIG. 2, although the large buttons LS(1) to LS(4) and the small buttons SS(1) and SS(2) are not shown these buttons may be displayed within the game screen IM during the display of the instruction paths.

The instruction paths R1 and R2, with the elapse of time, move from the deep side UP toward the reference line KL, with the distance to the reference line KL decreasing. There are cases in which the instruction paths R1 and R2, as shown in FIG. 2, are disposed at angles such that they are neither parallel to the spare tracks YT or the tracks TL nor do they intersect each other, in which case, alter the instruction paths R1 and R2 reach the reference line KL, the instruction positions of the instruction paths R1 and R2 with the reference line KL (intersection range corresponding to the widths of the instruction paths R1 and R2) continuously change along a direction of extension of the reference line KL.

When the instruction paths R1 and R2 appear on the game screen IM, cursors KG1 and KG2, corresponding respectively to the instruction paths R1 and R2 are displayed. In the following, the cursors KG1 and KG2 might be referred simply as cursor KG, without distinguishing therebetween. The timing of the start of displaying the cursors KG1 and KG2 may be arbitrarily established, as long as it is before the instruction paths R1 and R2 reach the reference line KL. The cursors KG1 and KG2 move along the reference line KL in response to a "specific operation" made by the user with respect to the touch panel 10. The user needs to make specific operations so that the cursor KG1 is within the intersection range between the instruction path R1 and the reference line KL and that the cursor KG2 is within the intersection range between the instruction path R2 and the reference line KL.

The specific operation in the first embodiment is an operation to move the moving part of the slide bars SB1 and SB2 up and down. The user can make contact with the vicinity of the slide bars SB1 and SB2 with an instructor and slide them up or down while maintaining the contact by the instructor so as to move up and down the sliders SD1 and SD2 that are moving points of the slide bars SB1 and SB2. The expression "the vicinity of" used above may be coincidence with the slide bars SB1 and SB2 may include a surrounding region of the slide bars SB1 and SB2, or may indicate inclusion within the region of the slide bars SB1 and SB2.

Figure 3:
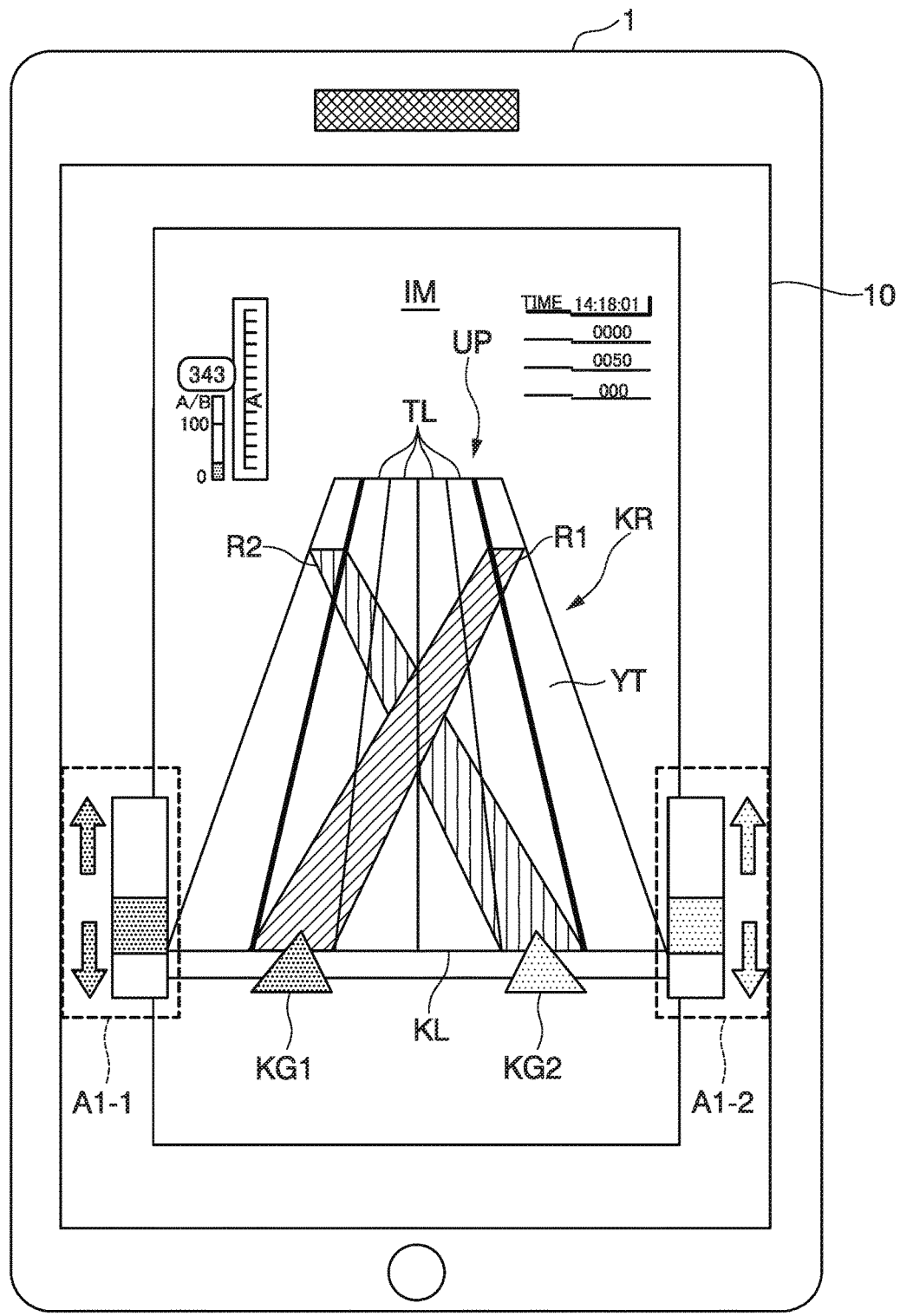
FIG. 3 shows an example of a detection area in which a specific operation is accepted by the game system according the first embodiment.

FIG. 3 shows an example of a affection area (corresponding to the "vicinity" noted above) in which a specific operation is accepted by the game system 1 according the first embodiment. If a user makes a sliding operation with respect to the detection area A1-1, the up-down operation amount amplitude and the direction (up or down) are extracted, and a quantity indicating the extracted amplitude is recognized as the operation amount of up or down movement in the moving part of the slide bar SB1 and, by extension, the amount of movement of the cursor KG1 along the reference line KL. If a user makes a sliding operation with respect to the detection area A1-2, the up-down operation amount amplitude and the direction (up or down) are extracted, and a quantity indicating the extracted amplitude is recognized as the operation amount of up and down movement in the moving part of the slide bar SB2 and, by extension, the amount of movement of the cursor KG2 along the reference line KL.

In the present embodiment, setting is made so that when the slider SD1 is moved upward, the cursor KG1 moves to the right, and when the slider SD1 is moved downward, the cursor KG1 moves to the left, and so that when the slider SD2 is moved upward, the cursor KG2 moves to the left, and when the slider SD2 is moved downward, the cursor KG2 moves to the right.

Setting may alternatively be made so that when the slider SD1 is move upward, the cursor KG1 moves to the left, when the slider SD1 is moved downward, the cursor KG1 moves to the right, when the slider SD2 is moved upward, the cursor KG2 moves to the right, and when the slider SD2 is moved downward, the cursor KG2 moves to the left.

Setting may also alternatively be made so that when slider SD1 is move upward, the cursor KG1 moves to the right, when the slider SD1 is moved downward, the cursor KG1 moves to the left, when the slider SD2 is moved upward, the cursor KG2 moves to the right, and when the slider SD2 is moved downward, the cursor KG2 moves to the left.

Setting may also alternatively be made so that when the slider SD1 is move upward, the cursor KG1 moves to the left, when the slider SD1 is moved downward, the cursor KG1 moves to the right, when the slider SD2 is moved upward, the cursor KG2 moves to the left, and when the slider SD2 is moved downward, the cursor KG2 moves to the right.

Therefore, as shown in FIG. 2 and FIG. 3, when the instruction path R1 angles to the right side moving from the forward side DP toward the deep side UP, because the intersection range between the instruction path R1 and the reference line KL moves to the right with the elapse of time, the user needs to make operations to move the cursor KG1 gradually rightward. That is, the user needs to make operations to move the moving part of the slide bar SB1 gradually upward. In the same manner, when the instruction path R2 angles to the left side moving from the forward side DP toward the deep side UP, because the midsection range between the instruction path R2 and the reference line KL moves to the left with the elapse of time, the user needs to make operations to move the cursor KG2 gradually leftward. That is, the user needs to make operations to move the moving part of the slide bat SB2 gradually upward.

In this case, for example, the position of the upper end of the slide bar SB1 responsive to the position of the right end of the cursor KG1 on the reference line KL, and the position of the lower end of the slide bar SB1 responsive to the position of the left end of the cursor KG1 on the reference line KL. Also, the position of the upper end of the slide bar SB2 responsive to the position of the left end of the cursor KG1 on the reference line KL, and the position of the lower end of the slide bar SB1 responsive to the position of the right end of the cursor KG1 on the reference line KL.

The positions of the sliders SD1 and SD2, rather than determining the positions of the cursors KG1 and KG2, may determine at least one of the movement speed and movement direction of the cursors KG1 and KG2. For example, when the slider SD1 is at the position of the upper end of the slide bar SB1 the cursor KG1 may move to the right at a constant speed and when the slider SD1 is at the position of the lower end of the slide bar SB1, the cursor KG1 may move to the left at a constant speed. Also, as an example of the positions of the sliders SD1 and SD2 determining both the movement speed and the movement direction of the cursors KG1 and KG2, the cursor KG1 may move to the right at high speed when the slider SD1 is located at the upper end of the slide bar SB1, the cursor KG1 may move to the left at high speed when the slider SD1 is located at the lower end of the slide bar SB1, and when the slider SD1 is located in the vicinity of the center of the slide bar SB1, the cursor KG1 may move to the right at low speed if it is above the center and to the left at low speed if it is below the center, and stop if it is located precisely at the center. This is the same in the other embodiment described below.

If the cursors KG1 and KG2 move outside the intersection range between the instruction paths R1 and R2 and the inference line KL, the user receives a penalty in the game. In contrast, the game score is, for example, increased in response to the amount of time the cursors KG1 and KG2 remain within the intersection range. The user may be granted a bonus if the cursors KG1 and KG2 remain within the intersection range until the instruction paths R1 and R2 cross the reference line KL. In some cases, the penalty may be given by either reducing a prescribed gage so as to end the game when a value reaches zero, or reducing the points earned. Points may be granted only, with no penalties. Points may be earned or a prescribed gage may be increased, for example, as a bonus.

Arrow indicators IF1 and IF2 that provide a guide for the operation directions of the slide bars SB1 and SB2 are displayed on the game screen IM. The slide bars SB1 and SB2 and the arrow indicators IF1 and IF2 are examples of guide indicators. By the display of such guide indicators, the user can intuitively understand what kind of operations should be made to move a cursor KG. The cursor KG1, the moving part of the slide bar SB1 and the arrow indicator IF1 are displayed with the same color or effect. In the same manner, the cursor KG2, the moving part of the slide bar SB2 and the arrow indicator IF2 are displayed, for example, with the same color or effect. Doing this enables the user to understand intuitively what kind of operations should be made to move each of the cursors KG.

In this case, although it can be envisioned that the cursor KG is moved by directly contacting the cursor KG, because in this case the instructor is located over the cursor, there are cases in which it is difficult for the user to visually recognize whether or not the cursor KG coincides with the intersection position between the reference line KL and the instruction path R. Also, if an attempt is still made to make visual recognition, an offset can occur in the touched location depending upon the viewing angle, so that even if the timing matches, it is difficult to make a judgment because the location is different.

Given this, the game system 1 of the first embodiment provides an area that accepts a specific operation at a location different from that of the reference line KL, as shown in FIG. 3. For this reason, the user can make the operation while visually recognizing whether or not the cursor KG coincides with the midsection position between the reference line KL and the instruction path R, thereby enhancement enjoyment of the game.

Figure 4:
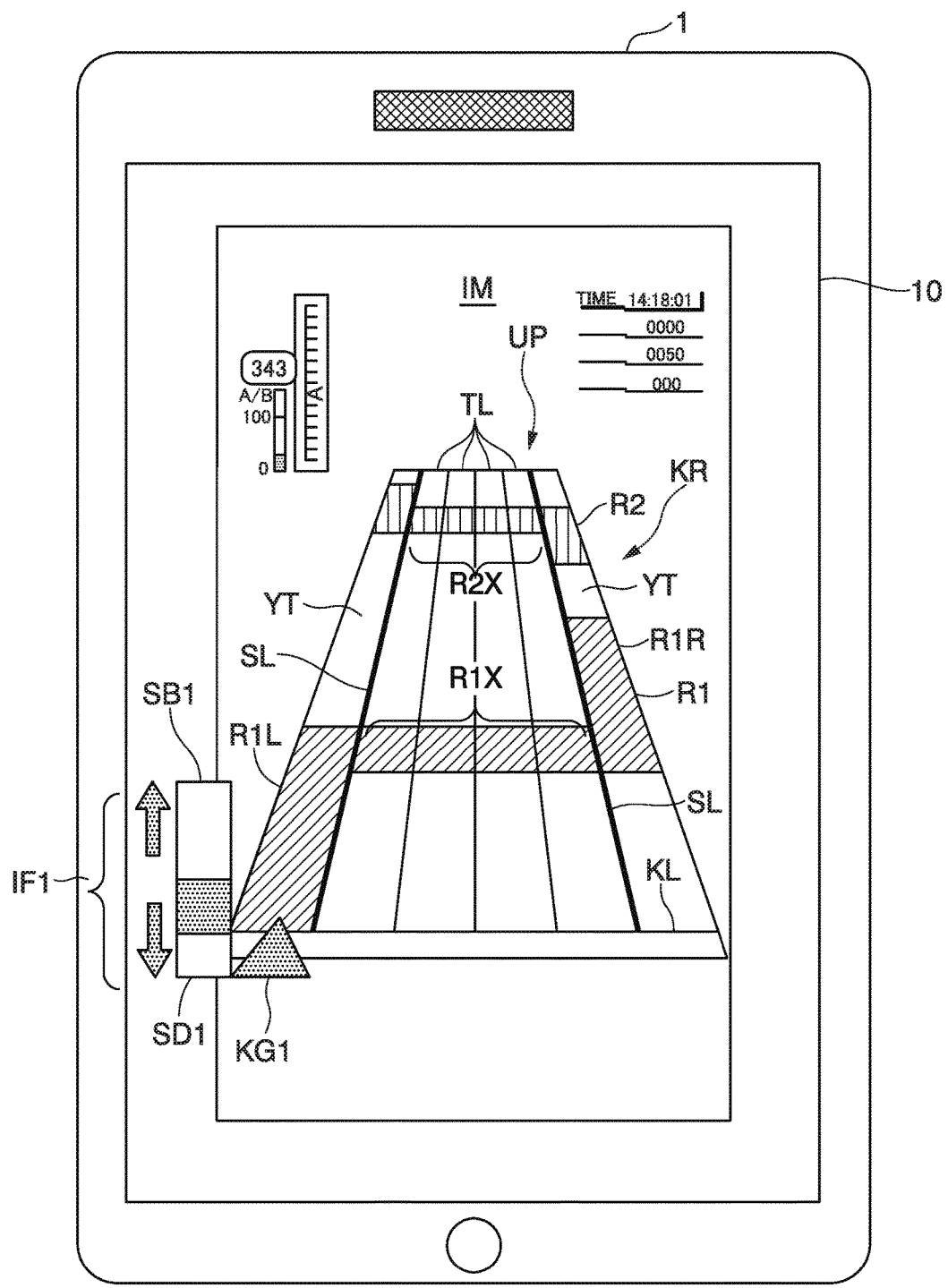
FIG. 4 shows another example of the game screen displayed by the game system according to the first embodiment.

FIG. 4 shows another example of the game screen IM displayed by the game system 1 according to the first embodiment. As shown in the drawing, there is a case in which the instruction path R1 has a part (marked R1X in the drawing) crossing over each track TL and which is substantially parallel to the reference line KL. That is, there is a case in which the instruction path R1 is formed by the joining of a left-side part R1L that fits within the left-side spare track YT, the above-noted part R1X, and a right-side part R1R that fits within the right-side spare track YT. In this case, the user needs to first adjust the cursor KG1 to the left-side part R1L of the instruction path R1 and then move the cursor KG1 up to the right-side spare track YT between the time of which the part R1X touches the reference line KL until it passes therethrough, and then, after the part R1X has passed through the reference line KL, needs to make operations to adjust the cursor KG1 to the right-side part R1R of the instruction path R1. In the same manner, there is the case in which the instruction path R2 has an extending pan (marked R2X in the drawing) that passes tracks TL and that is substantially parallel to the reference line KL, and the user needs to make operations that are the reverse of those noted above.

Figure 5:
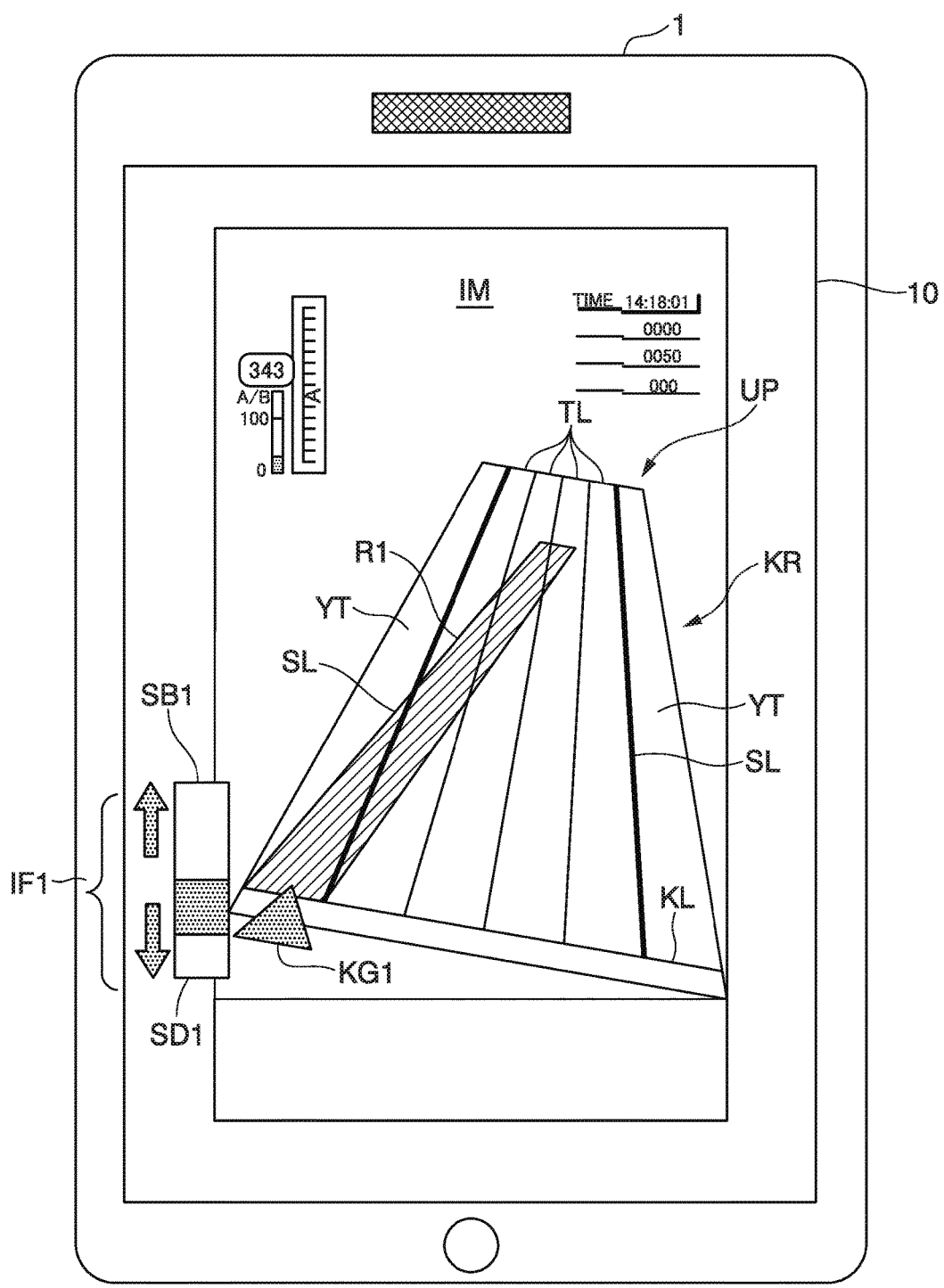
FIG. 5 shows another example of the game screen displayed by the game system according to the first embodiment.

FIG. 5 shows another example of the game screen IM displayed by the game system 1 according to the first embodiment. As shown in the drawing, the form of the display may be changed so that, accompanying progression of the game, the overall path display area KR is inclined to the right side or to the left side in the virtual three-dimensional space. Accompanying this change of the form of displaying the path display area KR, the form of displaying the tracks TL, the spate tracks YT, and the reference line KL change, thereby changing the position and inclination on the game screen IM. This processing is executed by a sequence processor 41 and the like, which will be described later.

Although, in FIG. 2 to FIG. 5, when the instruction paths R1 and R2 are displayed, the large buttons LS(1) to LS(4) and the small buttons SS(1) and SS(2) are no longer displayed on the game screen IM when the instruction paths R1 and R2, the object OJ and the large object DJ are displayed simultaneously, the game system 1 may cause a combined display on the game screen IM of the cursors KG1 and KG2, the large buttons LS(1) to LS(4), and the small buttons SS(1) and SS(2). Three or more instruction paths may be simultaneously displayed on the game screen IM, and one instruction path only may be displayed thereon. When the user makes a specific operation to move the cursors KG1 and KG2 an effect such as one that raises or lowers the volume of the melody may be executed. This applies as well to the embodiments to be described later.

(Functional Configuration)

Figure 6:
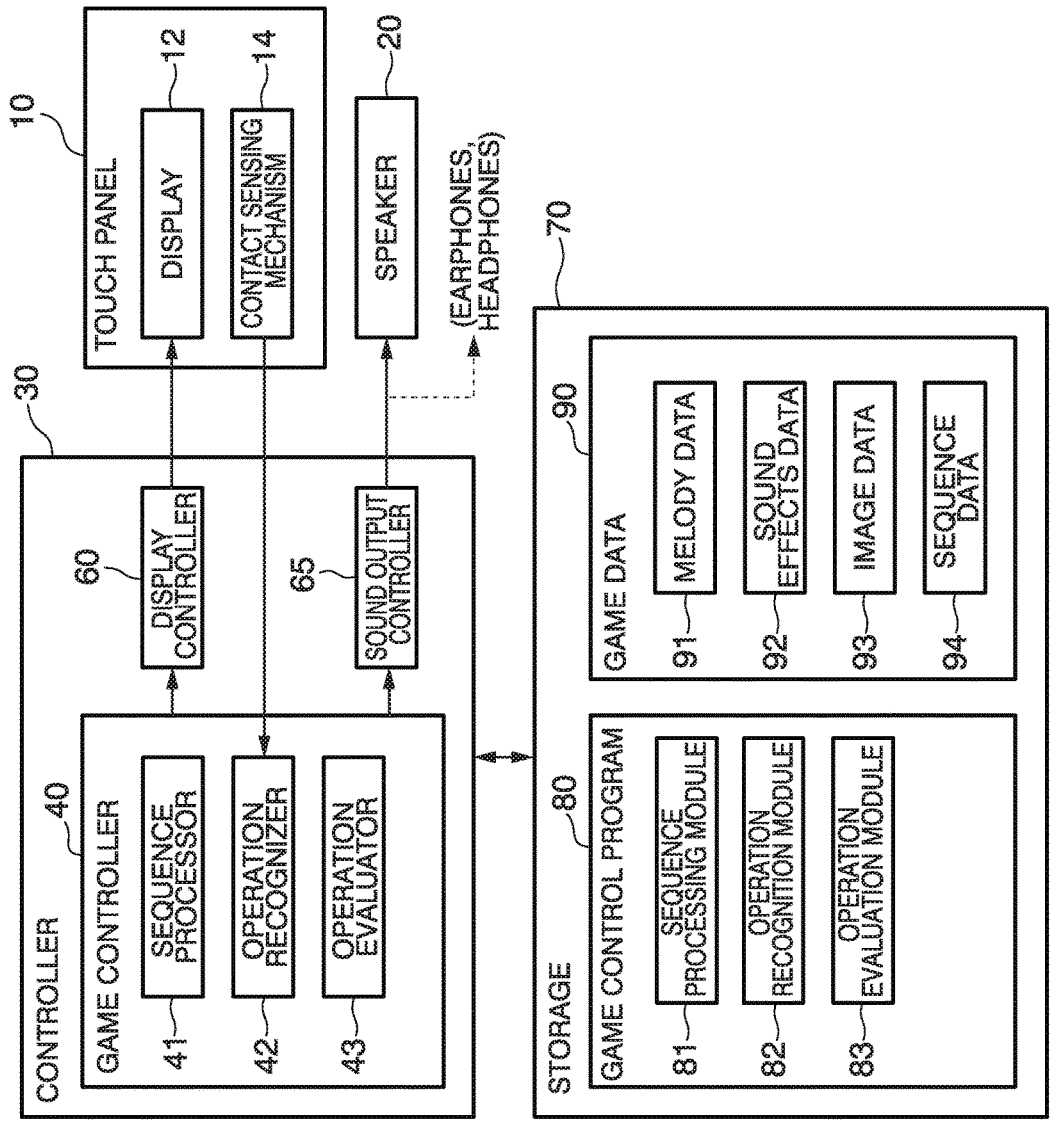
FIG. 6 shows an example of the functional configuration of the game system.

The functional constitution of the game system 1 for implementing the above-noted game will now be described. FIG. 6 shows an example of the functional configuration of the game system 1. The game system 1 has a touch panel 10, a speaker 20, a controller 30, and a storage 70. The touch panel 10 has a display 12 that is an LCD (liquid crystal display) or an organic EL (electroluminescence) display device or the like and a contact sensing mechanism 14 that senses contacting of the display surface (sensing surface) of the display 12. The contact sensing mechanism 14 can be, for example, a capacitive type, a resistive film type, a surface acoustic wave type, an infrared type, or an electromagnetic induction type. When an indicator makes contact with the display surface of the touch panel 10, the contact sensing mechanism 14 outputs the coordinates of the contact position to an operation recognizer 42. The speaker 20 outputs the game melody and sound effects. A sound output controller 65 may perform control so that, if the user connects earphones or headphones to the game system 1, sound may be output from the speaker 20 instead from the earphones or headphones. The storage 70 includes a ROM (read-only memory), a RAM (random-access memory), a flash memory, or an HDD (hard-disk drive), or the like.

The controller 30 has a game controller 40, a display controller 60, and a sound output controller 65. The game controller 40 has a sequence processor 41, the operation recognizer 42, and an operation evaluator 43. The sequence processor 41 is an example of a contoller; the operation recognizer 42 is an example of a recognizer and the operation evaluator 43 is au example of an evaluator. The storage 70 stores a game control program 80, which includes a sequence processing module 81, an operation recognition module 82, and an operation evaluation module 83, and game data 90, which includes melody data 91, sound effects data 92, image data 93, and sequence data 94, as well as other data.

The functional elements of the game controller 40 are, for example, software functional elements that function by a processor such as a CPU (central processing unit) (not shown) of the controller 30, executing the game control program 80 stored in the storage 70. The game control program 80 and the game data 90 stored in the storage 70 are downloaded, for example, from another computer via a network such as the Internet. Instead of doing that, a game control program 80 and game data 90 stored on a removable storage medium such as an SD card may be installed into the game system 1.

When the game controller 40 completes the initialization settings requited for executing the game of the present embodiment, it waits for an instruction from a user to start the game. The instruction to start the game includes, for example, an operation to select a melody to be played back as the game progresses, or an operation to select the difficulty. When an instruction is made to start the game, the game controller 40 leads the melody data 91 corresponding to the melody selected by the user and outputs it to the sound output controller 65 so as to start playback thereof from the speaker 20. The sound effects data 92 is recorded in association with unique codes for each sound effect for a plurality of sound effects to be output from the speaker 20 in response to the user's operation. Sound effects are audio that includes melodies and various other sounds. A plurality of sound effects data 92 of a prescribed number of octaves, changing the interval, may be provided.

The sequence processor 41 reads the sequence data 94 corresponding to the melody selected by the user, in synchronization with the melody playback, references the image data 93, and reproduces and outputs to the display controller 60 image data required for rendering on the game screen IM. By doing this, the sequence processor 41 displays the game screen IM on the display 12 of the touch panel 10. The image data 93 is data for displaying on the touch panel 10 the background image within the game screen, and various objects and icons.

The operation recognizer 42, based on the output of the contact sensing mechanism 14, recognizes tapping or long-pressing of the large buttons LS(1) to LS(4), tapping or long-pressing of the small button SS(1) or SS(2), and specific operations that move the moving part of the slide bars SB1 and SB2 up or down, winch are made with respect to the touch panel 10, and makes output to the operation evaluator 43.

The operation evaluator 43 judges whether or not a tap or long press recognized by the operation recognizer 42 responsive to the timing at which an object OJ or a huge object DJ contacts the reference line KL or to the contacting time period, and causes the judgment result to be reflected in the game results (for example, the game score). The operation evaluate 43 judges whether or not the position of the cursor KG moved by a specific operation recognized by the operation recognizer 42 (for example, the cursor KG reference point position) responsive to the change m the intersection range, that is, whether or not it is within the intersection range between the instruction path R1 and R2 and the reference line KL, and causes the judgment result to be reflected in the game results (for example, the game score).

(Sequence Data)

Figure 7:
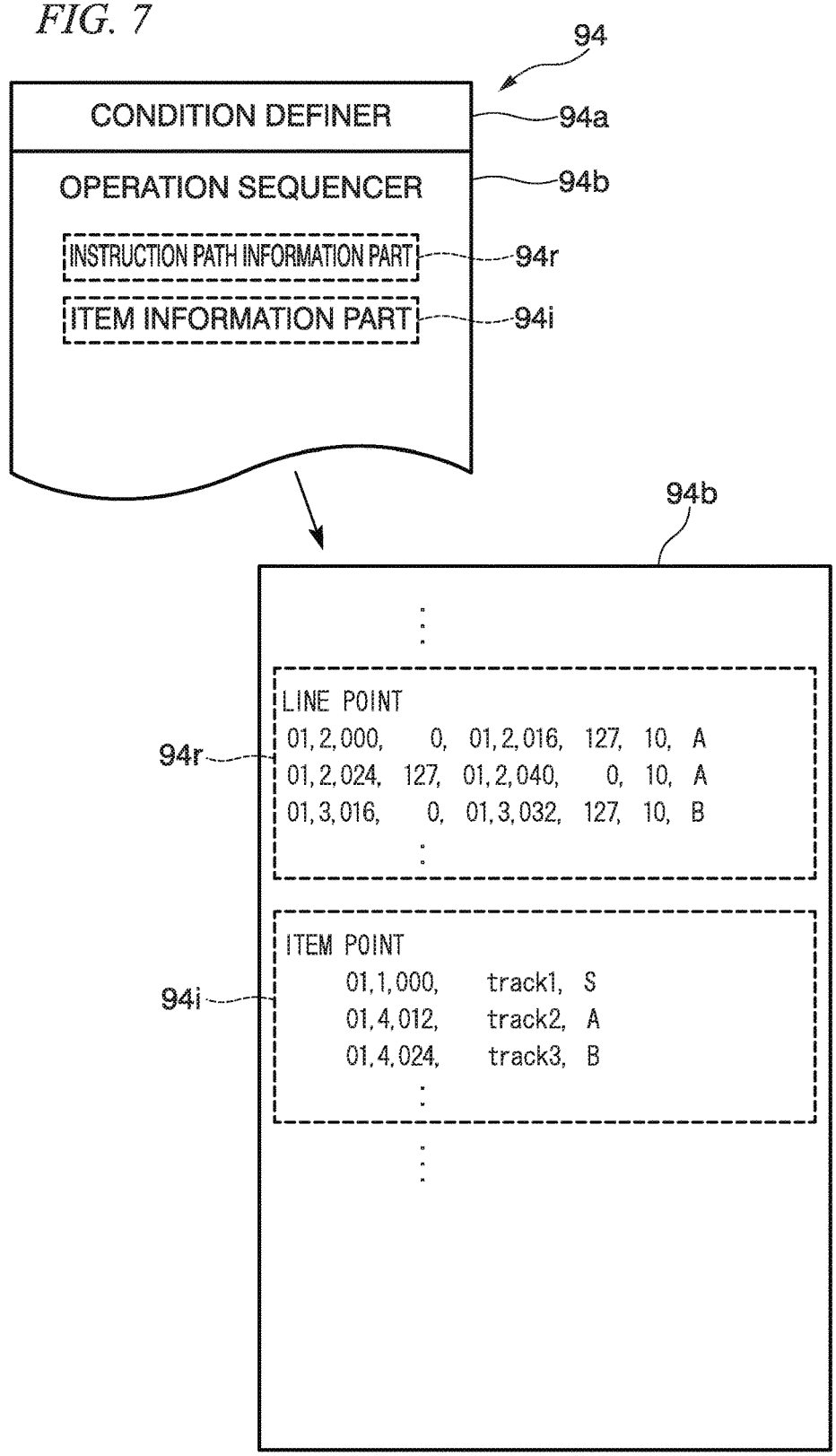
FIG. 7 shows an example of the contents of the sequence data.

FIG. 7 shows an example of the contests of the sequence data 94. The sequence data 94 defines the operation and the like that should be given to the user. At least one sequence data 94 is provided with respect to melody data 91 for one melody. The sequence data 94 has a condition definer 94a and an operation sequencer 94b. Information for specifying various conditions for executing a game such as the music tempo, the beat, the track, and the melody length are coded into the condition definer 94a. In the operation sequencer 94b, instruction operations with respect to the touch panel 10 are coded, in association with times (timings) in the melody. The operation sequencer 94b includes an instruction path information part 94r used to form the instruction path R, and an object information part 91*i* used to dispose an object OJ or a large object DJ on a track TL.

The instruction path information 94*r* includes information of times in the melody, information of intersection positions with the reference line KL, instruction path R width information, and instruction path pattern information. An intersection position, for example, responsive to the center of the intersection range. The instruction path information part 94*r* is constituted by a plurality of records in which these types of information are associated with each other. In the instruction path information part 94*r*, for example, information of the tune in the melody (starting time) when the leading edge of the instruction path R appears at a prescribed position of appearance, for example at the upper edge of the screen (for example, "01, 2, 000" in the drawing), information of the position of the instruction path R on the reference line KL at the starting time (for example, "0" in the drawing), information of the time (ending time) in the melody when the trailing edge of the instruction path R passes completely through the reference line KL, (for example, "01, 2, 016" in the drawing), information of the position of the path R on the reference line KL at the ending time (for example, "127" in the drawing), information of the width of the instruction path R (for example, "10" in the drawing), and information of the instruction path pattern (for example, "A" in the drawing) are coded in sequence from the left. "LINE POINT" is coded at the top of the instruction path information part 94*r*, this coding thereby distinguishing the instruction path information part 94*r* from the other information parts, for example, the object information part 94*i*.

The contents coded to the instruction path information part 94*r* are not limited to the above-noted contents. For example, the display starting time of the leading edge of the instruction path R being displayed at the upper ledge of the screen and the display ending time of the trailing edge of the instruction path R being displayed may be coded in the instruction path information part 94*r*. That is, instead of the ending time being coded in the instruction path information part 94*r*, the display ending time, which is the time at which the trailing edge of the instruction path R is displayed, may be coded therein. In this case, the sequence processor 41, based on the coded contents of the instruction path information part 94*r*, determines the time of the leading edge of the instruction path R reaching the reference line and the time of the trailing edge of the instruction path R passing the reference line KL (arrival completed) by calculation.

The instruction path information part 94*r* may have coded therein the time of the leading edge of the instruction path R reaching the reference line KL and the time of the trailing edge of the instruction path R passing the reference line KL (arrival completed). That is, instead of the starting time being coded in the instruction path information part 94*r*, the time of the leading edge of the instruction path R reaching the reference line KL may be coded. In this case, the sequence processor 41, based on the coded contents of the instruction path information part 94*r*, determines display starting time at which the leading edge of the instruction path R is display at the upper edge of the screen and the display ending time at which the trailing edge of the instruction path R is display by calculation.

In the instruction path information part 94*r*, at least one of 1) the display starting time at which the leading edge of the instruction path R is displayed at the upper edge of the screen, 2) the time at which the leading edge of the instruction path R reaches the reference line KL, 3) the display ending time at which the display of the trailing edge of the instruction path R at the upper edge of the screen ends, and 4) the time at which the trailing edge of the instruction path R passes through the reference line KL (arrival completed), and the duration time (number of seconds, number of beats, or the like) of the instruction path R continuing may be coded. One of 1) though 4) and the duration time of the instruction path R can be used to determine by calculation the other required information.

The various timing information is, for example, coded as the value of the bar number within the melody, the beat number, and the time within a beat, separated by commas. The timing within a beat is the elapsed time from the start of a beat, expressed as the number of units of time, when the length of a beat is divided evenly into n units of time. For example, if n=100, the time when ¼ of the second beat of the first bar of a melody has elapsed from the head of that beat would be coded as "01, 2, 025".

The information of the position on the reference line KL is coded using values indicating portions in the left and right directions in which the reference line KL extends. For example, as values indicating positions in this manner, the left-to-right length of the reference line KL is uniformly divided into a prescribed number of divisions, and positions corresponding to the unit length of the uniform divisions (unit range) are indicated by numbers (number of mat lengths) assigned in sequence from the left end. The number used as the prescribed number is, for example, 128. Numbers 0, 1, 2, and so on, up to 127 at the right end position are sequentially assigned from the left end position to the right end position of the reference line KL. That is, when the position of the left end of the reference line KL is specified, the value 0 is coded, and when the right end of the reference line KL is specified, the value 127 is coded. The significance of the reference line KL is that when a time corresponding to the information arrives, the center of the instruction path R is disposed at the position on the reference line KL set by time value. That is, the reference line KL information indicates the intersection position of the instruction path R on the reference line KL. Before the time corresponding to the information arrives, the information of the position on the reference line KL serves as a specification positions in the left-to-right directions of the track TL or spare track YT corresponding to the left-to-right position of the reference line KL.

The information of the position on the reference line KL also serves as information associating the instruction paths R1 and R2 and the cursors KG1 and KG2. For example, if the information of the position on the reference line KL at the time the instruction path R reaches the reference line KL responsive to the position of the right end, the cursor KG2 is specified, and if it responsive to the position of the left end, the cursor KG1 is specified. The specification of the cursors KG1 and KG2 may be done using the starting code of the instruction path information part 94*r*. For example, if "LINE POINT1" is coded at the beginning, the cursor KG1 may be specified, and if "LINE POINT2" is coded at the beginning, the cursor KG2 may be specified.

The width of the instruction path R is specified using the unit length indicating each position on the reference line KL. For example, if the width of the instruction path R is coded as "10", the width is specified as 10 unit lengths. The instruction path pattern is specified using a letter of the alphabet associated with each instruction path pattern. For example, in the examples of FIG. 2 and FIG. 3, A is associated with the X pattern, and in the example of FIG. 4, B is associated with the pattern that has the part R1X. The association of instruction path patterns with letters of the alphabet is implemented by a separate (able (not shown).

In the example of FIG. 1, the starting time ("000") of the second beat of the first bar is specified as the starting time, and the time at which "016" has elapsed from the starting time of the second beat of the first bar is specified as the ending time, and also the position of the left end of the reference line KL ("0") is specified as the starting time position and the position of the right end of the reference line KL ("127") is specified as the ending lime position. Also, "10" is specified as the width of the instruction path R, and "A", which is the X-type, is specified as the pattern. Therefore, an instruction path R having a width of "10" is displayed so as to describe the letter X, starting so that the position of the left end of the reference line KL is reached at the starting time ("000") of the second beat of the first bar, and so that, at the point at which "016" has elapsed from the starting time of the second beat of the first bar, ending is done at the right end.

The object information part 94*i* includes information of times during the melody, track information that specifics one of the four tracks TL, and object information that specifics the type of object. The object information 94*i* is constituted as a set of a plurality of records in which these types of information are associated with each other. In the example of FIG. 7, this information is coded as the information of times during the melody, track information, and object information, in that sequence from the left "ITEM POINT" is coded at the beginning of the object information 94*i*, this coding thereby distinguishing this information from other information parts, for example, the instruction path information part 94*r*.

The information of times during the melody is ended the same as in the instruction path information part 94*r*. The track information is coded using information that specifies the four tracks TL. For example, the numbers 1, 2, 3, and 4 are assigned to tracks TL starting at the left end, with "track1" coded to specify the leftmost track TL and "track2" coded to specify the track TL neighboring. The object information is coded by letters of the alphabet that are each associated with the object OJ and the large object DJ. For example, "S" is associated with the object OJ. For the large object DJ, "A" is associated for the case of straddling the two left-side tracks TL and "B" is associated for the case of straddling the two right-side tracks TL according to the position of tracks TL that appear. Other letters may be associated with the large object DJ, depending upon the length or the like thereof.

In the example of FIG. 7, an instruction is coded to display an object OJ ("S") that moves over the leftmost track ("track1") so as to reach the reference line KL at the starting time ("000") of the first beat of the first bar. An instruction is also coded to display a large object DJ that straddles and moves over the two left tracks TL so as to reach the reference line KL at the time when "0012" has elapsed from the starting time of the first beat of the first bar.

The sequence processor 41, based sequence data 94 such as this, executes processing to display an object OJ, a large object DJ, or the instruction path R. The sequence processor 41 performs controls to display so that, at the arrival time derived from the sequence data 94, the front part of the object OJ, the large object DJ, or the instruction path R coincides with the reference line KL. The arrival time is calculated, for example, by adding to the starting time obtained from the sequence data 94 the amount of time for the object OJ, the huge object DJ, or the instruction path R to reach the reference line KL. The added lime may be calculated based on the melody tempo or the like.

(Processing Flow)

The flow of processing executed by the game controller 40 will now be described, following a flowchart. The game controller 40 repeatedly executes the processing of each of the flowcharts shown in FIG. 8 to FIG. 11 at prescribed periods as processing required to display the game screen and the like. Although the description of the processing to control the display of the object OJ and the large object DJ will be omitted, it may be performed by the same processing as described below.

Figure 8:
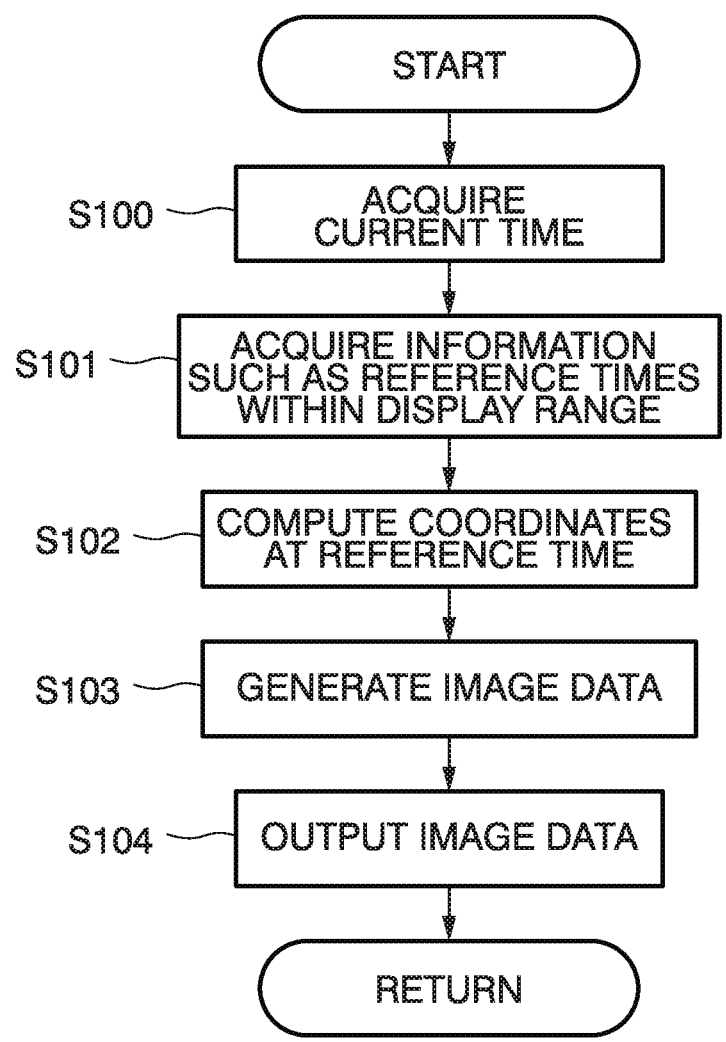
FIG. 8 is a flowchart showing the flow of instruction path display processing executed by the sequence processor.

FIG. 8 is a flowchart showing the flow of instruction path display processing executed by the sequence processor 41. The sequence processor 41 first acquires the current time in the melody (step S100). The current time is, for example, is acquired from an internal clock of the game controller 40 that keeps time, referenced to the start of the playback of the melody. Next, the sequence processor 41 acquires from the sequence data 94 the reference times (starting time and ending time) corresponding to the length of time for displaying on the game screen (prescribed time range) included in the instruction path information part 94*r*, the position and width, the pattern on the reference line KL, and information (step S101). The prescribed time range is, for example, set as the time length of the second bar of the melody from the current time.

Next, the sequence processor 41 computes the various coordinates within the game screen corresponding to each reference time (starting time and ending time) corresponding to the display range acquired at step S101 (step S102). An example of the coordinate computation is as follows.

First, the sequence processor 41 judges which cursor KG the instruction path R included in the display range is associated with. This judgment is made based on the position on the reference line KL specified as the ending time of the instruction path R. For example, this judgment is made by the association with the cursor KG2 if the position at the right end of the reference line KL is specified as the ending time and the association with the cursor KG1 if the position at the left end of the reference line KL is specified as the ending time. Next, the sequence processor 41 computes the position at each reference time in the time-axis direction from the reference line KL position, in accordance with the time difference between each reference time and the current time. Additionally, based on information of the position on the reference line KL associated with each reference time and the like, the position in the left-right direction at each reference time is determined. From these, it is possible to obtain the coordinates of each specified position in the left-to-right direction corresponding to each specified reference time along the time axis from the position of the reference line KL.

Next the sequence processor 41, based on the coordinates of the reference time calculated at step S102 and the various information acquired at step S101, generates image data required for plotting the instruction path R (step S103). An example of the generation of this image data is performed as follows. First, the sequence processor 11 generates the image data of the instruction path R, based on the coordinates of each reference time (the stalling time and the ending time) included in the instruction path information part 94*r*, the information of the specified instruction path R width, and the information of the instruction path pattern. Specifically, the sequence processor 41 connects the coordinates of the starting time and the coordinates of the ending time in accordance with the instruction path pattern, so as to have the specified instruction path R width. By doing this, image data is generated of the instruction path R extending in the time-axis direction, in accordance with the specified instruction path pattern, while passing through specified left-to-right positions in a specified time sequence of each reference time, that is, in the sequence of starting time and then ending time.

The sequence processor 41 then outputs the image data generated at step S105 to the display controller 60 (step S104) and ends the routine of this flowchart. By repeatedly executing the above-noted processing, the instruction path R that extends in the depth direction is displayed on the game screen IM, while passing through prescribed left-to-right positions at reference times coded in the sequence data 94. The instruction path R is displayed as moving in the depth direction, so that the positions of the instruction path R corresponding to each reference time coincide with the position of the reference line KL at the current time. Accompanying the start of the display of the instruction path R, the slide bars SB1 and SB2 and the arrow indicators IF1 and IF2 are also displayed. These slide bars and arrow indicators may be displayed at all times during playback of a melody, regardless of whether or not the instruction path R is being displayed.

Figure 9:
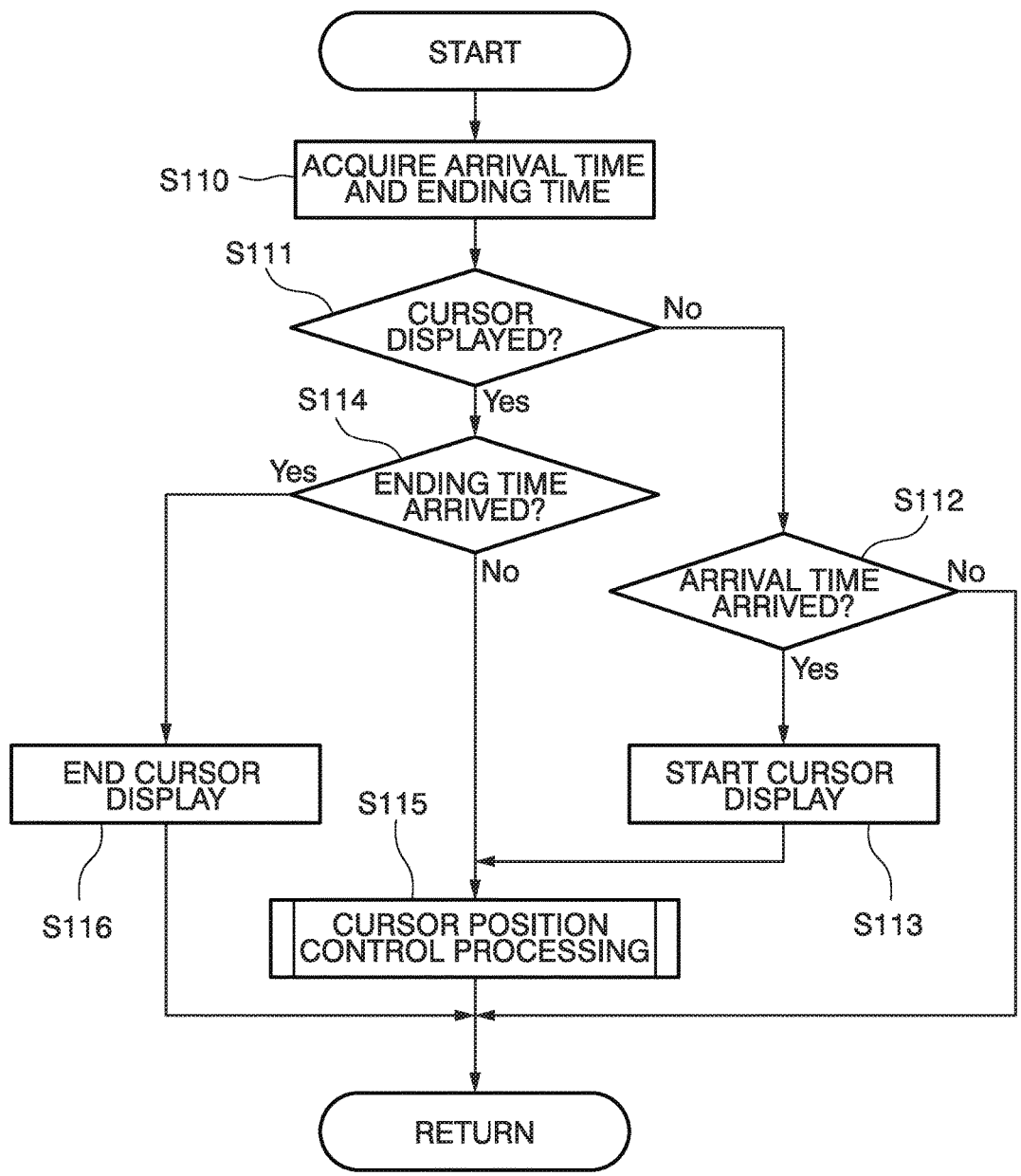
FIG. 9 is a flowchart showing the flow of cursor display processing executed by the sequence processor.

FIG. 9 is a flowchart showing the flow of cursor display processing executed by the sequence processor 41. First, the sequence processor 41 acquires from the instruction path information part 94r of the sequence data 94 information of the starting time and ending time of the instruction path R corresponding to the display range (step S110). Next, the sequence processor 41 judges whether or not the cursor KG is already displayed on the game screen (step S111). If the cursor KG is not already delayed on the game screen, the sequence processor 41 judges whether or not the arrival time of the instruction path R has arrived (step S112). If the time of arrival of the infraction path R has not arrived, the sequence processor 11 ends the routine of this flowchart.

Figure 10:
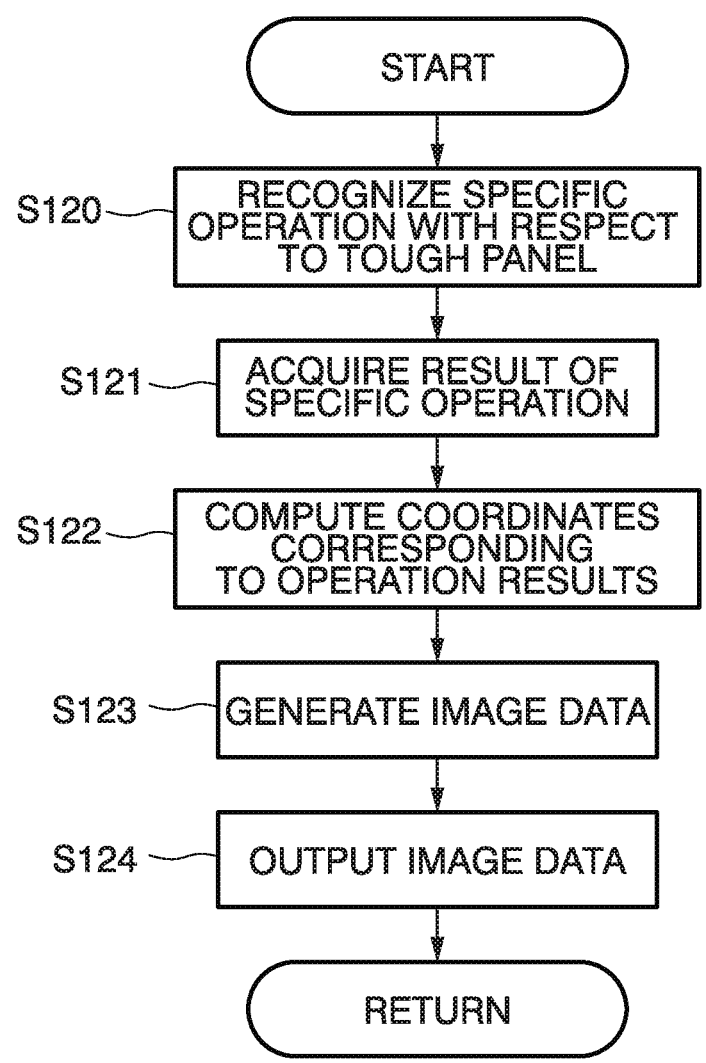
FIG. 10 is a flowchart showing the flow of cursor position control processing executed by the sequence processing part and the operation recognizer.

If the time of arrival of the instruction path R has arrived, the sequence processor 41 starts the display of the cursor KG (step S113) and performs the cursor position control processing shown in FIG. 10 (step S115). The cursor KG display may be set to start at a time set as a prescribed time (for example, approximately 1 second) before the arrival time, or at a prescribed number of beats (for example 2 beats) before the arrival time.

If the judgment is made at step S111 that the cursor KG is being displayed, the sequence processor 41 judges whether or not the ending time of the instruction path R has arrived (step S114). Even if the ending time of the instruction path R has not arrived, the sequence processor 41 performs cursor position control processing (step S115). If, however, the ending time has arrived, the sequence processor 41 ends the display of the cursor KG (step S116). The cursor KG may be displayed all the time during the playback of the melody, in which case the processing of the flowchart of FIG. 9 may be omitted.

FIG. 10 is a flowchart showing the flow of cursor position control processing executed by the sequence processing part 41 and the operation recognizer 42. The processing of this flowchart is executed for each cursor existing on the game screen IM. First, the operation recognizer 42 recognizes a "specific operation" of the operations with respect to the touch panel 10 (step S120). What type of operation is recognized as a specific operation is different depending upon the embodiment, and in the present embodiment an operation of moving the sliders SD1 and SD2 up and down is recognized as the specific operation. Next, the sequence processor 41 acquires the result of the specific operation from the operation recognizer 42 (step S121). The result of the specific operation is, for example, information including information indicating which cursor KG was operated, the direction of operation, the operation amount, and the like.

Next, the sequence processor 41 computes the coordinates of the cursor KG corresponding to the operation result (step S122), generates image data based on the computed cursor KG coordinates (step S123), outputs the generated image data to the display controller 60 (step S124), and ends the routine of this flowchart.

In this case, although the coordinates of the cursor KG may be determined as simply as a movement amount proportional to the operation amount of the specific operation so as to move the cursor KG, if the specific operation responsive to the current time is within a given range based on the sequence data 94, this may be recognized as an operation coinciding with the intersection range between the instruction path R and the reference line KL, the position of the cursor KG being determined so as to fit within the intersection range. That is, if the cursor KG position is determined strictly from the operation amount, even if it is offset from the intersection range, as long as the operation amount is within an allowable range, the cursor KG position may be caused to fit within the intersection range. This prevents an excessively difficult game.

Figure 11:
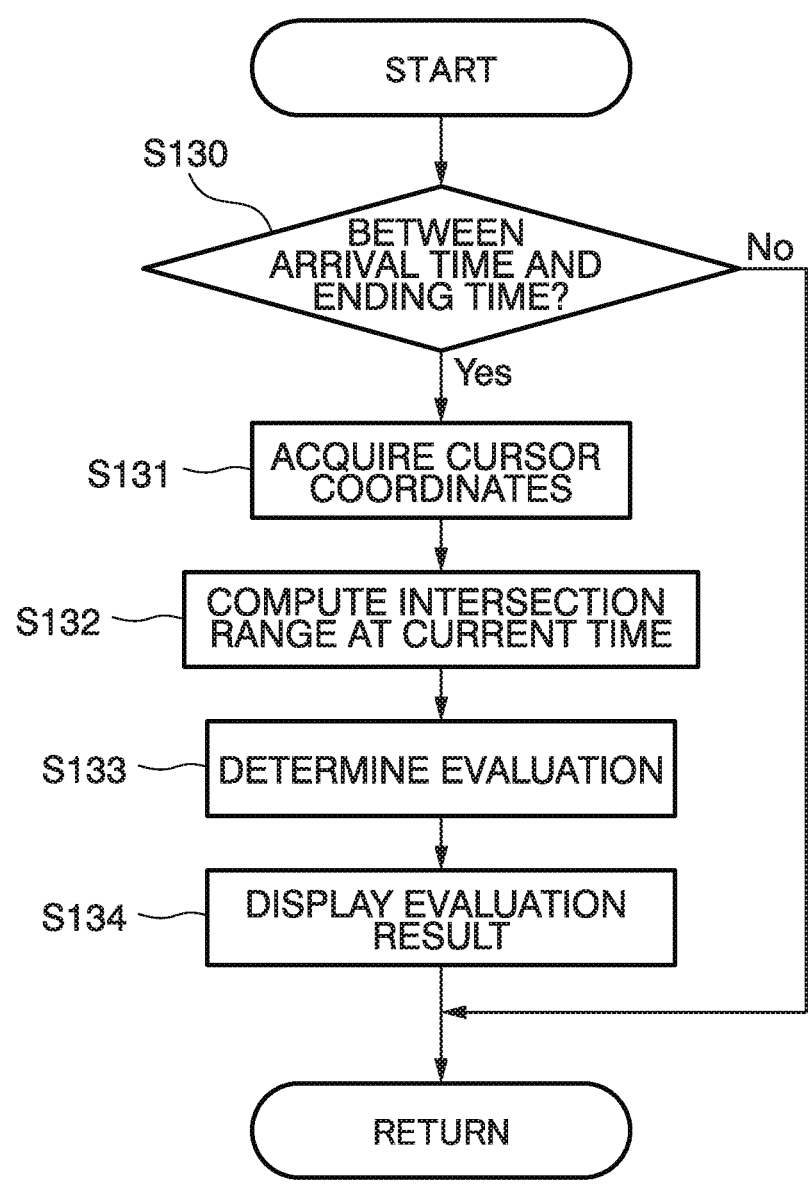
FIG. 11 is a flowchart showing the flow of operation evaluation processing executed by the operation evaluator.

FIG. 11 is a flowchart showing the flow of operation evaluation processing executed by the operation evaluator 43. The processing of this flowchart executed for each instruction path R. First, the operation evaluator 43 judges whether or not the current time is between the arrival time and the ending time for the target instruction path R (step S130). If the current time is not between the arrival time and the ending time for the target instruction path R, the operation evaluator 43 ends the routine of this flowchart. In the case of the operation evaluation processing for each instruction path R is performed only from the time the instruction path R reaches the reference line KL until it disappears, the judgment processing of step S130 can be omitted.

If the current time is between the arrival time and the ending time for the target instruction path R, the operation evaluator 43 acquires the cursor KG coordinates on the reference line KL (step S131). Next, the operation evaluator 43, based on the sequence data 94, computes the intersection range between the reference line KL and the instruction path R corresponding to the current time (step S132). Then, the operation evaluator 43 judges whether or not the position of the cursor KG fits within the intersection range, determines the evaluation (step S133), and instructs the display controller 60 to display the evaluation result (for example, the amount of increase in score or increase/decrease in the amount of remaining time) (step S134).

In this flowchart as well, as long as the specific operation is within a given range, based on the sequence data 94, this may be recognized as an operation coinciding with the intersection range between the instruction path R and the reference line KL, so that the cursor KG position is determined to fit in the intersection range.

(Summary)

According to the game control program, the game system, and the game control method of the first embodiment, the reference line KL, the instruction path R, and a cursor KG operated by a specific operation are displayed on the touch panel 10 and, after an instructor makes contact with in area A1-1 or A1-2 of the touch panel 10, an operation of sliding the instructor while maintaining contact by the instructor is recognized as a specific operation, and a judgment is made of whether or not the specific operation responsive to the change in the position of intersection between the reference line KL and the instruction path R and this is reflected in the game results, thereby enabling a heightening of interest in the game.

Also, according to the game control program, the game system, and the game control method of the first embodiment, because guide indicators (slide bars SB1 and SB1 and arrow indicators IF1 and IF2) that provide a guide to the operation direction of the specific operation are displayed on the touch panel 10, the user can intuitively understand what type of operation should be made to move the cursor KG. The arrow indicators IF1 and IF2 need not be displayed on the game screen IM.

Second Embodiment

A game system 2 according to the second embodiment will now be described. With the exception of the differences that are described below, the functional configuration (refer to FIG. 6) and processing details of the various constituent elements of the game system 2 according to the second embodiment are the same as in the first embodiment.

Figure 12:
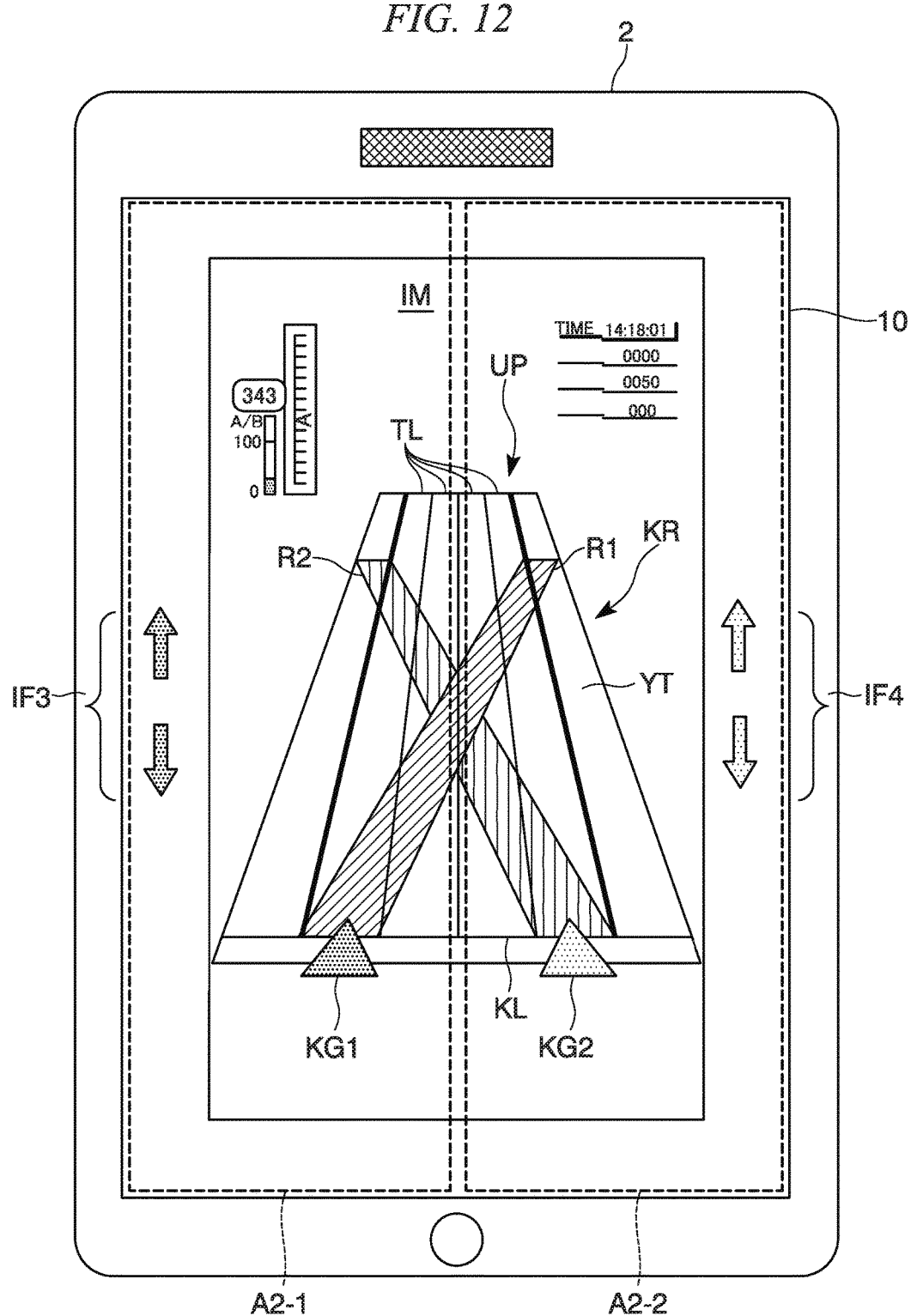
FIG. 12 shows an example of the sensing area in which the game system according to the second embodiment accepts a specific operation.

FIG. 12 shows an example of the sensing area in winch the game system 2 according to the second embodiment accepts a specific operation. In the present embodiment, of the overall sensing area of the touch panel 10 is divided into left and right sensing areas, with the center part in the lateral direction thereof as the base line. An up/down sliding operation with respect to the sensing area A2-1 is associated with movement of the cursor KG1, and an up/down sliding operation with respect to the sensing area A2-2 is associated with movement of the cursor KG2. Therefore, when the user makes a sliding operation with respect to the sensing area A2-1, the vertical-direction amplitude thereof is extracted, and a quantity indicating the extracted amplitude is recognized as the operation amount of up or down movement of the cursor KG1 along the reference line KL. Also when the user makes a sliding operation with respect to the sensing area A2-2, the vertical-direction amplitude thereof is extracted, and a quantity indicating the extracted amplitude is recognized as the operation amount of up or down movement of the cursor KG2 along the reference line KL.

For example, when the user makes a sliding operation upward within the sensing region A2-1, the cursor KG1 moves to the right, and when the user makes a sliding operation downward within the sensing region A2-1, the cursor KG1 moves to the left. When the user makes a sliding operation upward within the sensing region A2-2, the cursor KG2 moves to the left, and when the user makes a sliding operation downward within the sensing region A2-2, the cursor KG2 moves to the right. The relationship between these may be reversed. In the present embodiment, although the entire sensing surface of the touch panel 10 is divided substantially equally into the left and right regions, it is not restricted to substantially equal division and, for example, the sensing areas A2-1 is made to be larger or smaller than the sensing areas A2-2. The areas used as the sensing areas need not be the entire sensing surface, and may be a part of the sensing surface. The broken lines indicating the sensing areas A2-1 and A2-2 in FIG. 12 are not actually displayed on the game screen IM, but may be displayed thereon and, if they are displayed, it is possible for the user to easily recognize each of them.

In this manner, because in the game system 2 of the second embodiment the specified operation is recognized in the areas A2-1 and A2-2, which are larger than the sensing areas occupying the game screen IM in the first embodiment, operation is easy. Therefore, the game system 2 and the like of the second embodiment is preferably applied to devices having a relatively small sensing surface to sense operations, such as a mobile telephone, a tablet terminal, or the like. The game system 2 or the like of the second embodiment is not restricted to these, and can be applied to an enclosure installed in an amusement facility such as a game center.

The game screen IM, similar to the first embodiment, displays arrow indicators IF3 and IF4, which provide a guide to the direction for a specific operation. The arrow indicators IF3 and IF4 are examples of guide indicators. By displaying guide indicators such as this, the user can intuitively understand what type of operation should be made to move the cursor KG. For example, the cursor KG1 and the arrow indicator IF3 are displayed with the same color or effect. In the same manner, the cursor KG2 and the arrow indicator IF4 are displayed with the same color or effect. This enables the user to intuitively understand what type of operation to make to move each of the cursors KG. However, the arrow indicators IF3 and IF4 need not be displayed in the game screen IM.

Other points are the same as in the fast embodiment. The game screen IM when the instruction path R is not displayed is the same, for example, as shown in FIG. 1. The game system 2 of the second embodiment displays a game screen IM such as shown by examples presented in FIG. 1 and FIG. 5 and can perform the same processing as in the first embodiment. In this embodiment as well, slide bars may be displayed.

In this case, the slide bars function not to indicate the sensing area for a specific operation, but rather simply to indicate the operation amount of the cursors KG1 and KG2. If only one instruction path R is displayed on the game screen IM at the same time, the sensing area for accepting a specific operation may be the entire sensing surface of the touch panel 10.

According to the game control program, the game system, and the game control method of the second embodiment, the reference line KL, the instruction path R, and the cursor KG that is operated by a specific operation are displayed on the touch panel 10 and, after an instructor makes contact with an area A2-1 or A2-2 of the touch panel 10, an operation of sliding the instructor while maintaining contact by the instructor is recognized as a specific operation, a judgment is made of whether or not the specific operation responsive to the change in the position of intersection between the reference line KL and the instruction path R, and this is reflected in the game results, thereby enabling a heightening of interest in the game.

Also, according to the game control program, the game system, and the game control method of the second embodiment, because guide indicators (arrow indicators IF3 and IF3) that provide a guide to the operation direction of the specific operation are displayed on the touch panel 10, the user can intuitively understand what type of operation should be made to move the cursor KG.

According to the game control program, the game system, and the game control method of the second embodiment, as shown in FIG. 12, an area that accepts a specific operation is provided in a location different from the reference line KL, thereby enabling the user to make operations while visually recognizing whether or not the cursor KG coincides with the position of intersection between the reference line KL and the instruction path R and enabling the provision of a more enjoyable game.

In the second embodiment, in the case of operations made with respect to an object OJ and a large object DJ, the sensing area may be established in accordance with the track TL. That is, of the four tracks TL shown in FIG. 12, the two left-side columns may be made to correspond to a tap or long-press of the sensing area A2-1 and the two right-side columns may be made to correspond to a tap or long-press of the sensing area A2-2.

Third Embodiment

Figure 13:
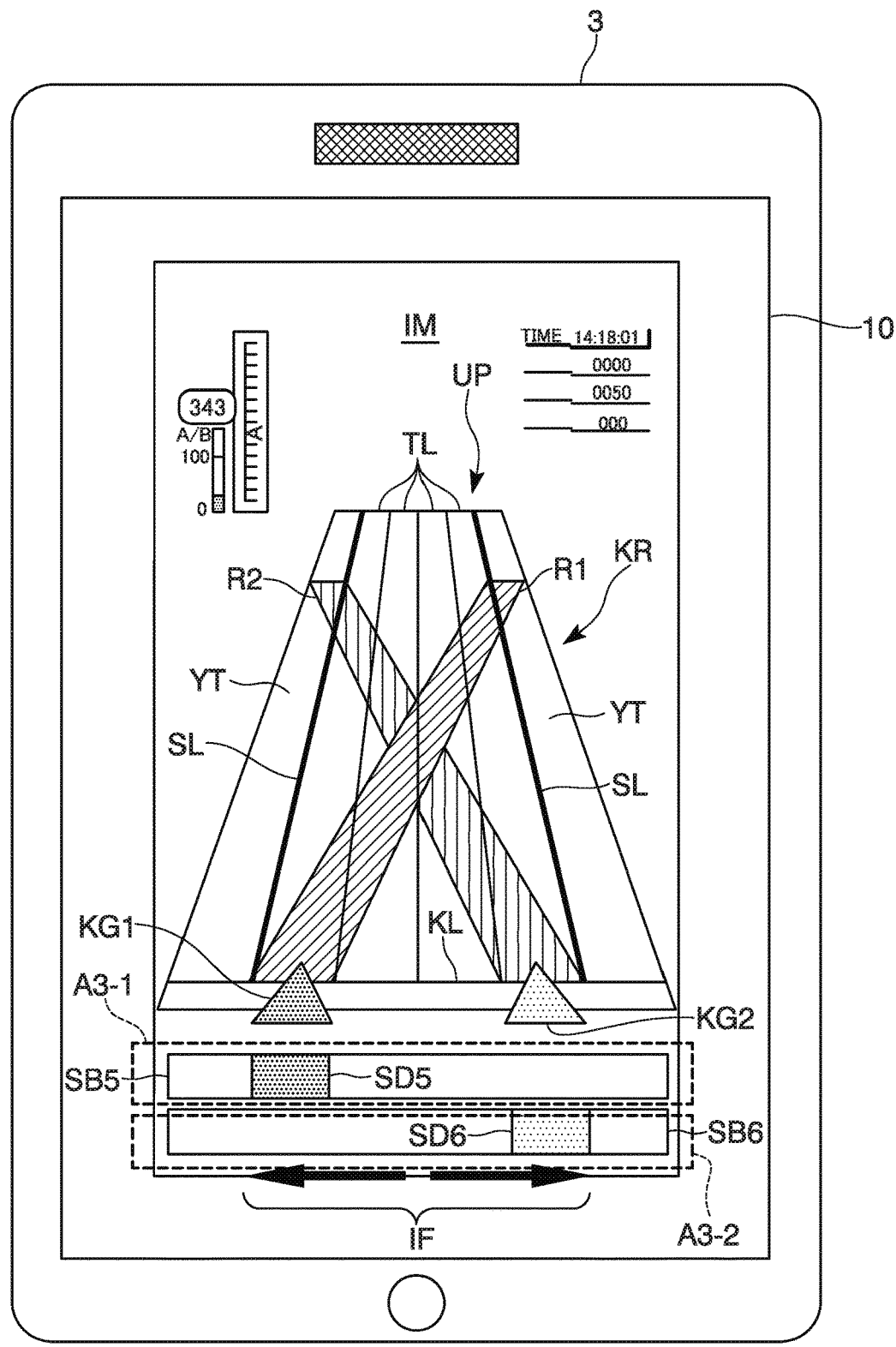
FIG. 13 shows an example of the game screen displayed by the game system according to the third embodiment.

A game system 3 according to the third embodiment will now be described. With the exception of the differences that are described below, the functional configuration (refer to FIG. 6) and processing details of the various constituent element of the game system 3 according to the third embodiment are the same as in the first embodiment. FIG. 13 shows an example of the game screen IM displayed by the game system 3 according to the third embodiment.

The specific operation in the third embodiment is an operation of moving sliders SD5 and SD6, which are moving parts of the slide bars SB5 and SB6, to the left and right. The user can make contact with the vicinity of the slide bars SB5 and SB6 with an instructor and slide them left or right while maintaining the contact by the instructor so as to move the sliders SD5 and SD6 left or right. The expression "the vicinity of" used above may be coincidental with the slide bars SD5 and SD6, or may indicate inclusion within the surrounding region of the slide bars SD5 and SD6. The sensing areas A3-1 and A3-2 in FIG. 13 are examples of sensing areas in which the game system 3 according to the third embodiment accepts specific operations. When a user makes a sliding operation with respect to the sensing area A3-1, the left-right operation amount amplitude is extracted, and a quantity indicating the extracted amplitude is recognized as the operation amount of left or right movement in the moving part of the slider SD5 and, by extension, as the amount of movement of the cursor KG1 along the reference line KL. When a user makes a sliding operation with respect to the sensing area A3-2, the left-right operation amount amplitude is extracted, and a quantity indicating the extracted amplitude is recognized as the operation amount of left or light movement in the moving part of the slider SD6 and, by extension, as the amount of movement of the cursor KG2 along the reference line KL.

Only one of the slide bars SB5 and SB6 may be made operable, or both may be made operable simultaneously. In the present embodiment, for example, if the slider SD5 is moved rightward, the cursor KG1 moves to the right, and if the slider SD5 is moved leftward, the cursor KG1 moves to the left. Also, setting is made so that if the slider SD6 is moved rightward, the cursor KG2 moves to the right, and if the slider SD6 is moved leftward, the cursor KG1 moves to the right. These relationships may be reversed, meaning that the slide bar SB5 may correspond to the cursor KG2 and the slide bar SB6 may correspond to the cursor KG1.

Arrow indicator IF that provides a guide to the operation direction of the slide bars SB5 and SB6 are displayed on the game screen IM. The slide bars SB5 and SB6 and the arrow indicators IF are example of guide indicators. By displaying such guide indicators, the user can intuitively understand what type of operation should be made to move a cursor KG. The cursor KG1 and the slider SD5 are displayed, for example, with the same color or effect and, similarly, the cursor KG2 and the slider SD6 are displayed, for example, with the same color or effect. This enables the user to intuitively understand what type of operation should be made to move each of the cursors KG.

Other points are the same as in the first embodiment. The game screen IM when the instruction path R is not displayed is the same, for example, as shown in FIG. 1. The game system 3 of the third embodiment displays a game screen IM such as shown by examples presented in FIG. 4 and FIG. 5 and can perform the same processing as in the first embodiment.

According to the game control program, the game system, and the game control method of the third embodiment, the reference line KL, an instruction path R, and a cursor KG operated by a specific operation are displayed on the touch panel 10 and, after an instructor makes contact with an area A3-1 or A3-2 of the touch panel 10, an operation of sliding the instructor while maintaining contact by the instructor is recognized as a specific operation, a judgment is made of whether or not the specific operation responsive to the change in the position of intersection between the reference line KL, and the instruction path R, and this is reflected in the game results, thereby enabling a heightening of interest in the game.

Also, according to the game control program, the game system, and the game control method of the first embodiment, because a guide indicator (the arrow indicator IF) that provides a guide to the operation direction of the specific operation are displayed on the touch panel 10, the user can intuitively understand what type of operation should be made to move the cursor KG. The arrow indicator IF need not be displayed on the game screen IM.

Also, according to the game control program, the game system, and the game control method of the third embodiment, because the movement direction of the cursors KG and the direction of the specific operation are parallel, it is possible to progress through the game by intuitively understandable operations. Also, according to the game control program, the game system, and the game control method of the third embodiment, by reversing the directional relationship of correspondence between the operation direction and the direction of movement of the cursors KG when an operation with respect to a special object fails, it is possible to achieve a thrilling game.

According to the game control program, the game system, and the game control method of the third embodiment as shown in FIG. 13, an area that accepts a specific operation is provided in a location different from the reference line KL, thereby enabling the user to make operations while visually recognizing whether or not the cursor KG coincides with the position of intersection between the reference line KL and the instruction path R and enabling the provision of a more enjoyable game.

Fourth Embodiment

Figure 14:
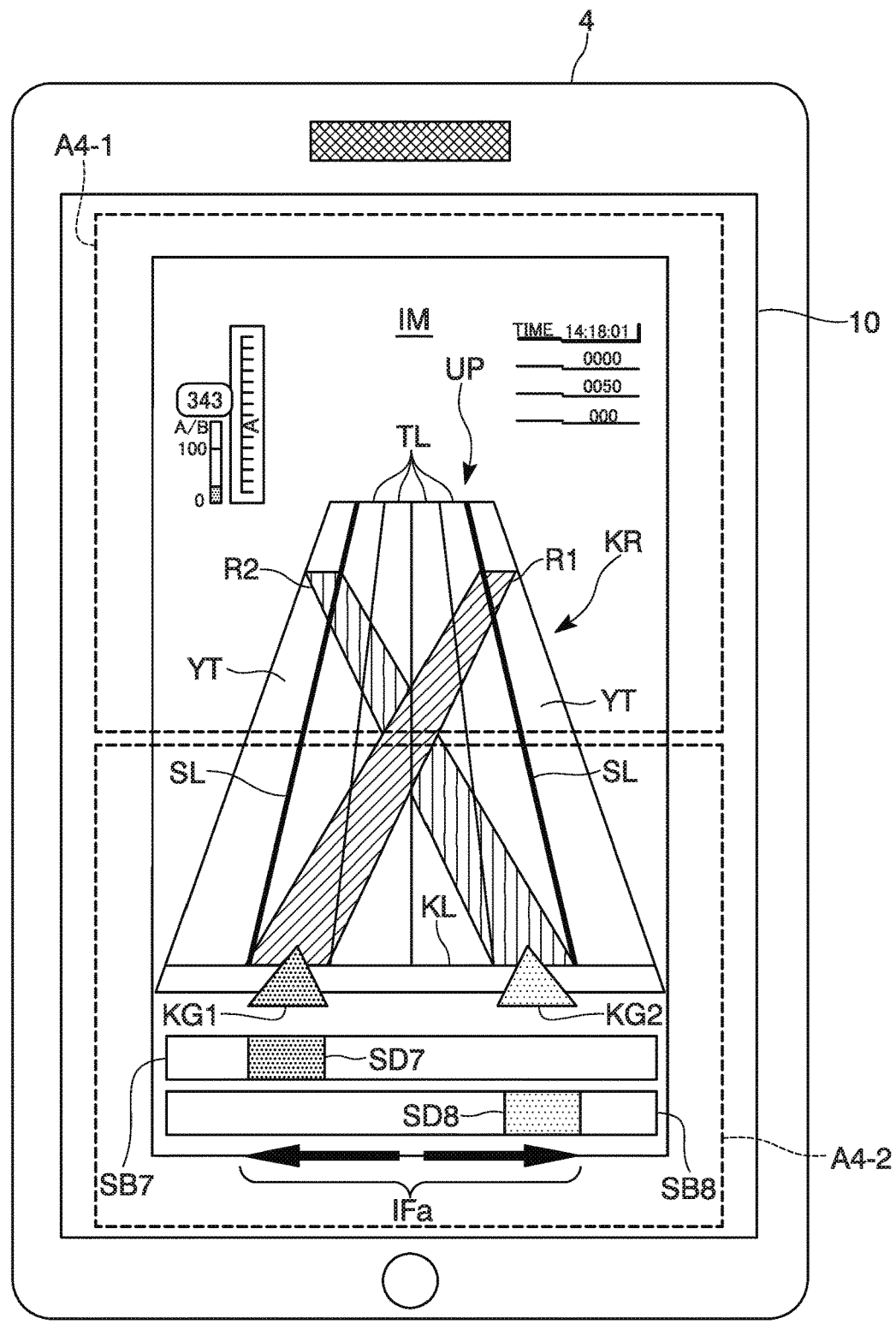
FIG. 14 shows an example of the sensing region in which the game system according to the fourth embodiment accepts specific operations.

A game system 4 according to the fourth embodiment will now be described. With the exception of the differences that are described below, the functional configuration (refer to FIG. 6) and processing details of the various constituent element of the game system 4 according to the fourth embodiment are the same as in the first embodiment. FIG. 14 shows an example of the sensing region in which the game system 4 according to the fourth embodiment accepts specific operations.

In the present embodiment, of the overall sensing area of the touch panel 10 is divided into top and bottom sensing areas, with the center part in the vertical direction thereof as the base line. A left/right sliding operation with respect to the sensing area A4-1 is associated with movement of the cursor KG1, and a left/right sliding operation with respect to the sensing area A4-2 is associated with movement of the cursor KG2. Therefore, when the user makes a sliding operation with respect to the sensing area A4-1, the horizontal-direction amplitude thereof is extracted, and a quantity indicating the extracted amplitude is recognized as the operation amount of left or right movement of the cursor KG1 along the reference line KL. Also when the user makes a sliding operation with respect to the sensing area A4-2, the vertical-direction amplitude thereof is extracted, and a quantify indicating the extracted amplitude is recognized as the operation amount of movement of the cursor KG2 along the reference line KL. Although the touch panel 10 in the present embodiment is divided substantially uniformly up and down, the division is not restricted to being substantially uniform. For example, the sensing area A4-1 may be made larger or smaller than the sensing area A4-2. It is not necessary that the overall sensing surface be used for the sensing areas, which can, of course, be a part of the sensing surface. The broken lines indicating the sensing areas A4-1 and A4-2 in FIG. 14 are not actually displayed on the game screen IM, but may be displayed thereon and, if they are displayed, it is possible for the user to easily recognize each of them.

For example, if the user makes a rightward sliding operation within the sensing area A4-1, the cursor KG1 moves to the right, and if the user makes a leftward sliding operation within the sensing area A4-1, the cursor KG1 moves to the left. If the user makes a rightward sliding operation within the sensing area A4-2, the cursor KG2 moves to the right, and if the user makes a leftward sliding operation within the sensing area A4-2, the cursor KG2 moves to the left. These relationships may be reversed. That is, the sensing area A4-1 may be associated with the cursor KG2, and the sensing area A4-2 may be associated with the cursor KG1.

In this manner, in the game system 4 according to the fourth embodiment specific operation the size of the areas A4-1 and A4-2 occupying the game screen IM for recognizing specific operations is larger than in the third embodiment, thereby enabling easy operation. Therefore, the game system 4 and the like according to the fourth embodiment is preferably applied to devices having a relatively small sensing surface to sense operations, such as a mobile telephone, a tablet terminal, or the like. The game system 4 or the like according to the fourth embodiment is not restricted to these, and can be applied to an enclosure installed in an amusement facility such as a game center.

The game screen IM, similar to the third embodiment displays an arrow indicator IFa, which provides a guide to the direction for a specific operation. The arrow indicator IFa is an example of a guide indicator. By displaying a guide indicator such as this, the user can intuitively understand what type of operation should be made to move the cursor KG.

Other points are the same as in the first embodiment. The game screen IM when the instruction path R is not displayed is the same, for example, as shown in FIG. 1. The game system 4 of the fourth embodiment displays a game screen IM such as shown by examples presented in FIG. 4 and FIG. 5 and can perform the same processing as in the first embodiment. In this embodiment as well, the slide bars SB7 and SB8 and the sliders SD7 and SD8 may be displayed, such as shown in FIG. 14. In this case, the slide bars SB7 and SB8 function not to indicate the sensing area for a specific operation, but rather simply to indicate the operation amount of the cursors KG1 and KG2. If only one instruction path R is displayed on the game screen IM at the same time, the sensing area for accepting a specific operation may be the entire sensing surface of the touch panel 10.

According to the game control program, the game system, and the game control method of the fourth embodiment, the reference line KL, the instruction path R, and the cursor KG that is operated by a specific operation are displayed on the touch panel 10 and, after an instructor makes contact with an area A4-1 or A4-2 of the touch panel 10, an operation of sliding the instructor while maintaining contact by the instructor is recognized as a specific operation, a judgment is made of whether or not the specific operation responsive to the change in the position of intersection between the reference line KL and the instruction path R, and this is reflected in the game results, thereby enabling a heightening of interest in the game.

Also, according to the game control program, the game system, and the game control method of the fourth embodiment, because a guide indicator (arrow indicator IFa) that provides a guide to the operation direction of the specific operation is displayed on the touch panel 10, the user can intuitively understand what type of operation should be made to move the cursor KG.

According to the game control program, the game system, and the game control method of the fourth embodiment, because the movement direction of the cursors KG and the direction of the specific operation are parallel, it is possible to progress through the game by intuitively understandable operations. Also, according to the game control program, the game system, and the game control method of the fourth embodiment, by reversing the directional relationship of correspondence between the operation direction and the direction of movement of the cursors KG when an operation with respect to a special object fails, it is possible to achieve a thrilling game.

According to the game control program, the game system, and the game control method of the fourth embodiment, as shown in FIG. 14, an area that accepts a specific operation is provided in a location different from the reference line KL, thereby enabling the user to make operations while visually recognizing whether or not the cursor KG coincides with the position of intersection between the reference line KL and the instruction path R and enabling the provision of a more enjoyable game.

In the fourth embodiment, in the case of operations made with respect to an object OJ and a large object DJ, the sensing area may be established in accordance with the track TL. That is, of the four tracks XL shown in FIG. 14, the two left-side columns may be made to correspond to a tap or long-press of the sensing area A4-1 and the two right-side columns may be made to correspond to a tap or long-press of the sensing area A4-2.

Fifth Embodiment

Figure 15:
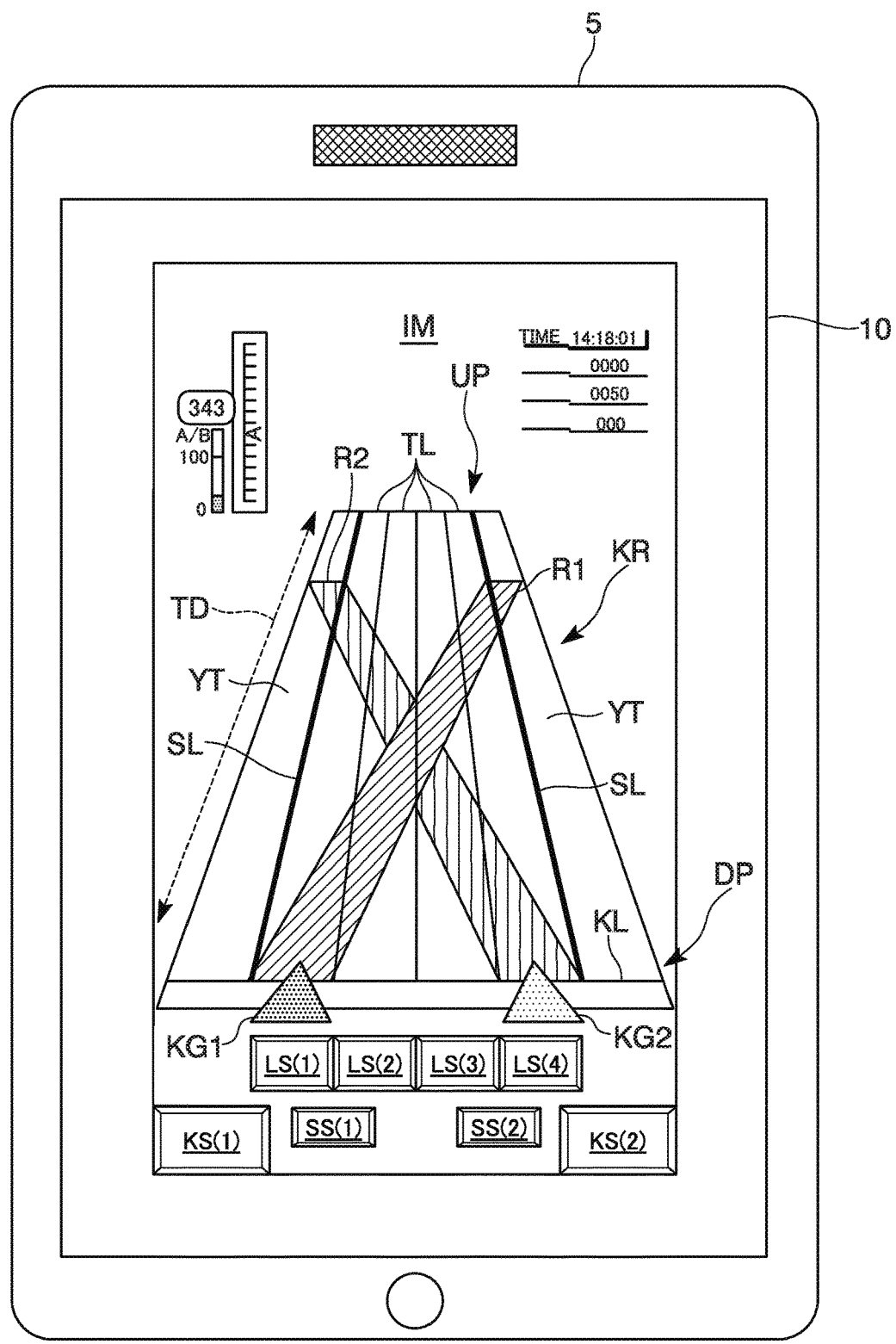
FIG. 15 shows an example of the game screen displayed by the game system according to the fifth embodiment.

A game system 5 according to the fifth embodiment will now be described. With the exception of the differences that are described below, the functional configuration (refer to FIG. 6) and processing details of the various constituent elements of the game system 5 according to the fifth embodiment are the same as in the first embodiment. FIG. 15 shows an example of the game screen IM displayed by the game system 5 according to the fifth embodiment. As shown in the drawing, in the game system 5 according to the fifth embodiment, in addition to the large buttons LS(1) to LS(4) and the small buttons SS(1) and SS(2), cursor movement buttons KS(1) and KS(2) are displayed on the game screen IM.

The specific operation in the fifth embodiment is a long-press operation of the cursor movement button KS(1) or KS(2) by an instructor and removal of the instructor therefrom. For example, if the instructor makes contact with the cursor movement button KS(1) for at least a prescribed time, the cursor KG1 move to the right as long as the contacting continues, and when the instructor is removed from the cursor movement button KS(1), moves to the left. Also, if the instructor makes contact with the cursor movement button KS(2) for at least a prescribed time, the cursor KG2 move to the left as long as the contacting continues, and when the instructor is removed from the cursor movement button KS(2), the cursor KG1 moves to the right. In the fifth embodiment, as shown in FIG. 4, if an instruction path R having a part crossing laterally over the tracks TL and extending substantially in parallel to the reference line KL appears, by removing the instructor once and then touching the cursor movement button KS(1) or KS(2) for a short time (for example, a time shorter than the above-noted prescribed time), the cursor KG1 or the KG2 moves at a speed that is higher than the above-noted cases in which the "contacting continues" and "removing" the instructor. That is, if an instruction path R such as shown in FIG. 4 appears, a long-press operation is continued when the instruction path R1L intersects with the reference line KL, a tap operation is made at the timing at which the path that intersects with the reference line KL readies the instruction path R1X from the instruction path R1L, and a long-press operation is started at the tuning at which the path that intersects with the reference line KL readies the instruction path R1R from the instruction path R1X. In this case, when the making of a tap operation is sensed, the controller 30 performs display control so as to move the cursor KG1 at high speed from the instruction path R1L to the instruction path R1R.

Other points are the same as in the first embodiment. The game screen IM when the instruction path R is not displayed is rise same, for example, as shown in FIG. 1. The game system 5 of the fifth embodiment displays a game screen IM such as shown by examples presented in FIG. 4 and FIG. 5 and can perform the same processing as in the first embodiment.

According to the game control program, the game system, and the game control method of the above-described fifth embodiment, the reference line KL, the instruction path R, and the cursor KG that is operated by a specific operation are displayed on the touch panel 10 and, if an instructor is in contact with the cursor movement button KS(1) or KS(2) of the touch panel 10 for at least a prescribed time, that operation is recognized as a specific operation, a judgment is made of whether or not the specific operation responsive to the change in the position of intersection between the reference line KL and the instruction path R, and this is reflected in the game results, thereby enabling a heightening of interest in the game.

According to the game control program, the game system, and the game control method of the fifth embodiment, because a specific operation is made by continuously touching one point, there is no need to allocate a large sensing surface. Therefore, the game system or the like according to the fifth embodiment is preferably applied to a device having a relatively small sensing surface to sense operations, such as a mobile telephone or table terminal. The game system or the like according to the fifth embodiment is not restricted to these, and can be applied to an enclosure installed in an amusement facility such as a game center.

According to the game control program, the game system, and the game control method of the fifth embodiment, a shown in FIG. 15, an area that accepts a specific operation is provided in a location different from the reference line KL, thereby enabling the user to make operations while visually recognizing whether or not the cursor KG coincides with the position of intersection between the reference line KL and the instruction path R and enabling the provision of a mote enjoyable game.

Sixth Embodiment

Figure 16:
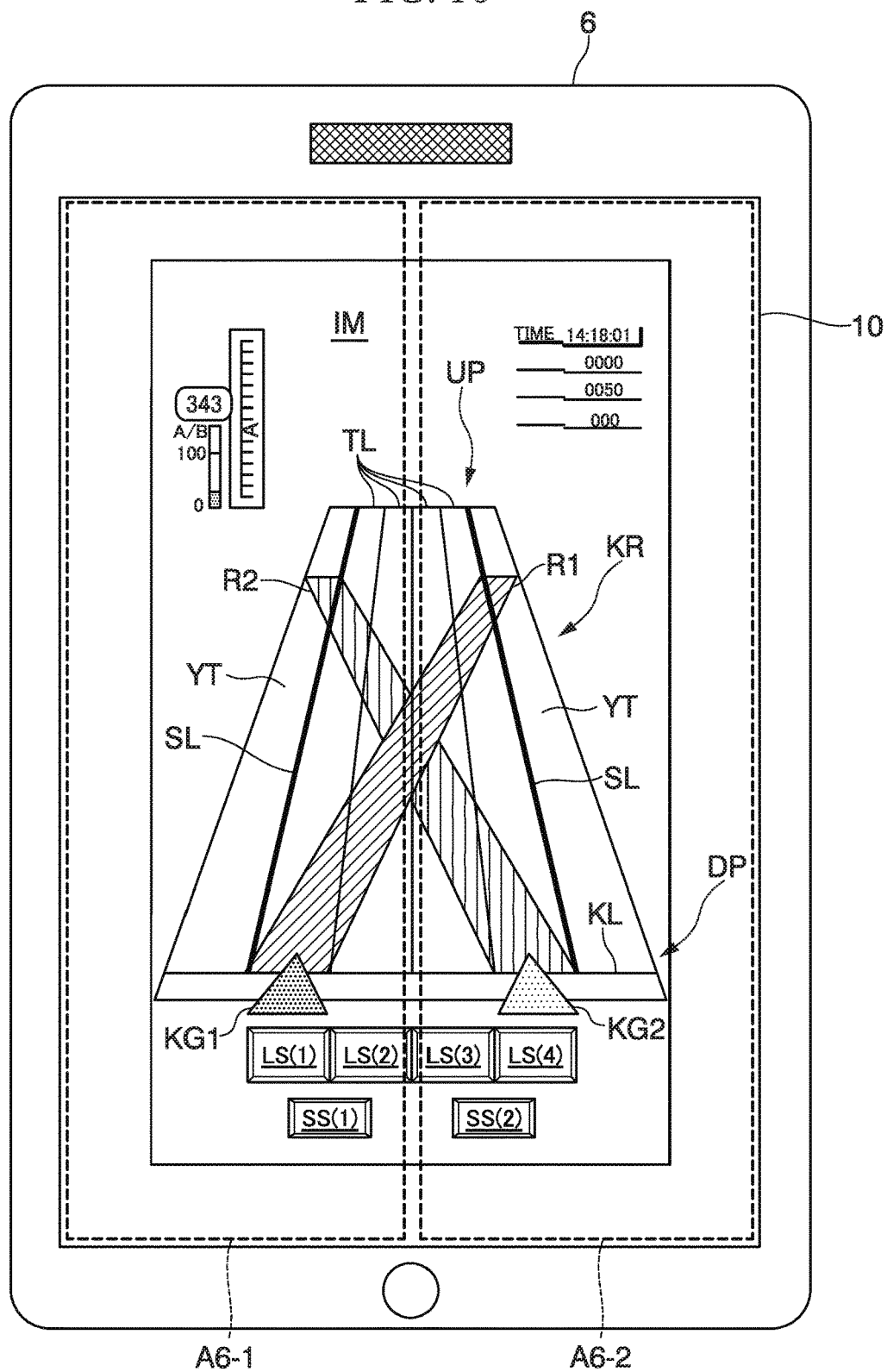
FIG. 16 shows an example of the sensing region in winch the game system according to the sixth embodiment accepts specific operations.

A game system 6 according to the sixth embodiment will now be described. With the exception of the differences that are described below, the functional elements (refer to FIG. 6) and processing details of the various constituent elements of the game system 6 according to the sixth embodiment are the same as in the first embodiment. FIG. 16 shows an example of the sensing region in which the game system 6 according to the sixth embodiment accepts specific operations.

In the present embodiment, of the overall sensing area of the touch panel 10 is divided into left and right sensing areas, with the center part in the lateral direction thereof as the base line. An operation with respect to the sensing area A6-1 is associated with movement of the cursor KG1, and an operation with respect to the sensing area A6-2 is associated with movement of the cursor KG2. For example, if an instructor makes contact with the sensing area A6-1 for at least a prescribed time, the cursor KG1 moves to the right while contact is being made, and when the instructor is removed from the sensing area A6-1, the cursor KG1 moves to the left. Also, if an instructor makes contact with the sensing area A6-2 for at least a prescribed time, the cursor KG2 moves to the left while contact is being made, and when the instructor is removed from the sensing area A6-2, the cursor KG2 moves to the right. The relationship between these may be reversed. That is, the sensing area A6-1 may be associated with the cursor KG2 and the sensing area A6-2 may be associated with the cursor KG1, and the relationship between the direction of the cursor KG during contact by the instructor with the sensing area and the direction thereof when the instructor is removed may be reversed.

Although the touch panel 10 in the present embodiment is divided substantially uniformly left and right, the division is not restricted to being substantially uniform. For example, the sensing area A6-1 may be made larger or smaller than the sensing area A6-2. It is not necessary that the overall sensing surface be used for the sensing areas, which can, of course, be a part of the sensing surface. The broken lines indicating the sensing areas A6-1 and A6-2 in FIG. 16 are not actually displayed on the game screen IM, but may be displayed thereon and, if they are displayed, it is possible for the user to easily recognize each of them.

In the sixth embodiment as shown in FIG. 4, if an instruction path R having a part crossing laterally over the tracks TL and extending substantially in parallel to the reference line KL appears, if the sensing area A6-1 is flicked to the right, the cursor KG1 is moved to the right at a speed that is higher than during the above-noted time of continuing contact and removal of the instructor, and if the sensing area A6-1 is flicked to the left, the cursor KG1 is moved to the left at high speed. If the sensing area A6-2 is flicked to the left, the cursor KG2 is moved to the left at a speed that is higher than during the above-noted time of continuing contact and removal of the instructor, and if the sensing area A6-2 is flicked to the right, the cursor KG2 is moved to the right at high speed. In this case, the flick operation is, for example, defined as a sliding operation over a prescribed distance within a prescribed time.

If only one instruction path R is displayed on the game screen IM at the same time, the sensing area for accepting a specific operation may be the entire sensing surface of the touch panel 10.

Other points are the same as in the first embodiment. The game screen IM when the instruction path R is not displayed is the same, for example, as shown in FIG. 1. The game system 6 of the sixth embodiment displays a game screen IM such as shown by examples presented in FIG. 4 and FIG. 5 and can perform the same processing as in the first embodiment.

According to the above-described game council program, game system, and game control method of the sixth embodiment, the reference line KL, the instruction path R, and the cursor KG that is operated by a specific operation are displayed on the touch panel 10 and, if an instructor makes contact with an area A6-1 or A6-2 of the touch panel 10 for at least a prescribed time, a specific operation is recognized, a judgment is made of whether or not the specific operation responsive to the change in the position of intersection between the reference line KL and the instruction path R, and this is reflected in the game results, thereby enabling a heightening of interest in the game.

According to the game control program, the game system, and the game control method of the sixth embodiment, because a specific operation is made by continuously touching one point, there is no need to allocate a large sensing surface. Therefore, the game system or the like according to the sixth embodiment is preferably applied to a device having a relatively small sensing surface to sense operations, such as a mobile telephone or table terminal. The game system or the like according to the sixth embodiment is not restricted to these, and can be applied to an enclosure installed in an amusement facility such as a game center.

According to the game control program, the game system, and the game control method of the sixth embodiment, as shown in FIG. 16, an area that accepts a specific operation is provided in a location different from the reference line KL, thereby enabling the user to make operations while visually recognizing whether or not the cursor KG coincides with the position of intersection between the reference line KL and the instruction path R and enabling the provision of a more enjoyable game.

Seventh Embodiment

A game system 7 according to the sixth embodiment will now be described. With the exception of the differences that are described below, the functional elements (refer to FIG. 6) and processing details of the various constituent elements of the game system 7 according to the seventh embodiment are the same as in the first embodiment.

Figure 17:
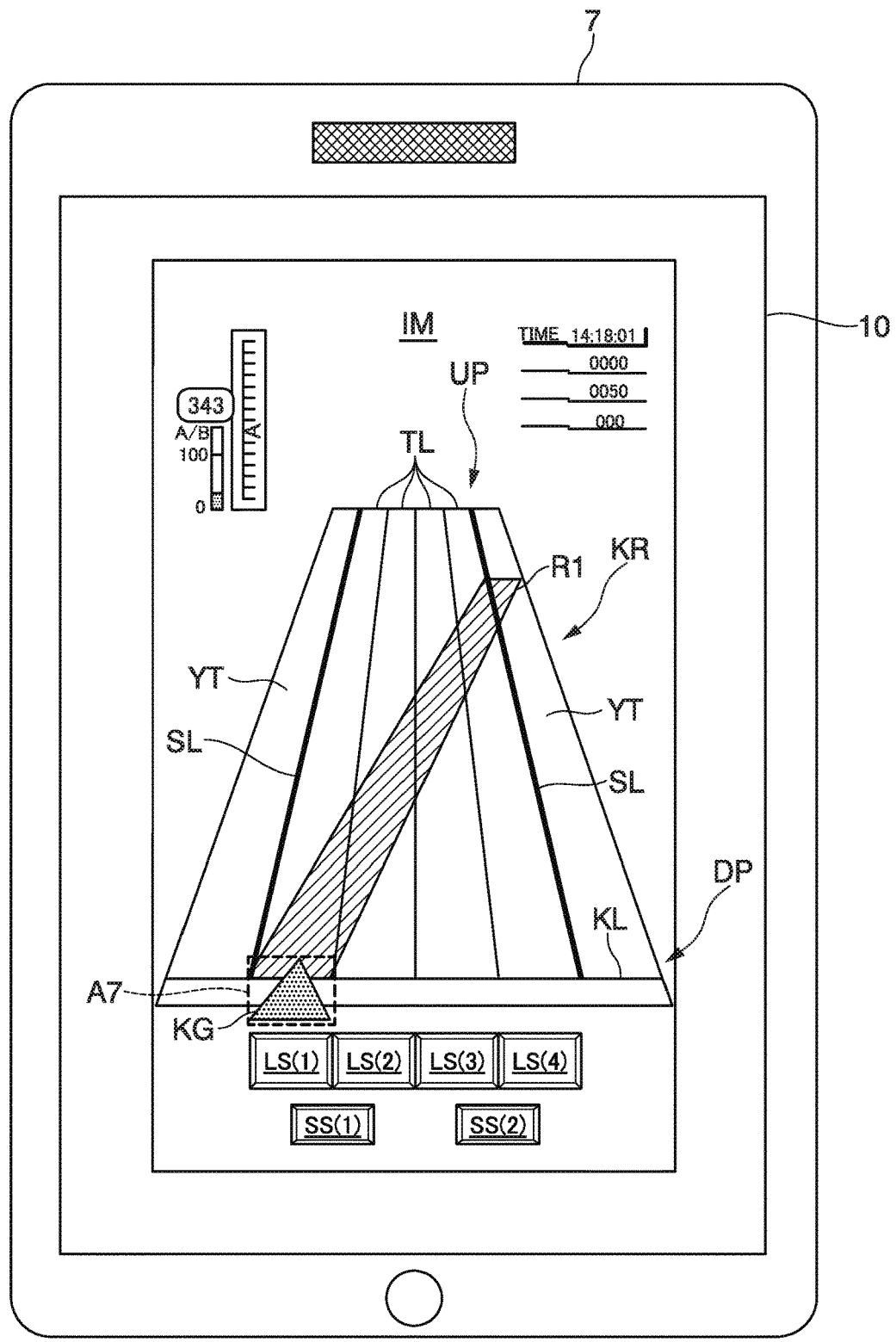
FIG. 17 shows an example of the sensing region in which the game system according to the seventh embodiment accepts specific operations.

In the seventh embodiment, the specific operation is the direct contacting of the display position of the cursor KG by an instructor and movement on the reference line KL while maintaining contact to track the intersection range. FIG. 17 shows an example of the sensing region in which the game system 7 according to the seventh embodiment accepts specific operations. In the game system 7, when an instructor contacts the region A7, the cursor KG is moved in response to movement of the instructor on the reference line KL. In the seventh embodiment, basically only one instruction path R is displayed on the game screen IM at a given time.

Instead of movement while maintaining contact, an operation of intermittently contacting the reference line KL may be accepted. That is, when an instructor contacts a prescribed range having the cursor KG at the center the cursor KG moves a given distance toward the location in which the instructor touches, and the user is caused to make repeated operations of the instructor to contact locations indicating the direction in which it is desired that the cursor KG be moved. The cursor KG may remain stationary unless the instructor contacts with the cursor KG.

In a prescribed area that includes the reference line KL, if an instructor makes contact with a position to either the left or right referenced to the cursor KG, the cursor KG may move over the reference line KL toward the position of contacting by the instructor. That is, for example, in FIG. 17 when an instructor makes contact at a position to the right of the position of the cursor KG on the reference line KL, during the time that the instructor is making contact, the cursor KG is moved at a prescribed speed over the reference line KL in the direction toward the position of contact. In this case as well the cursor KG may remain stationary unless the instructor contacts with the cursor KG.

Other points are the same as in the first embodiment. The game screen IM when the instruction path R is not displayed is the same, for example, as shown in FIG. 1. The game system 7 of the seventh embodiment displays a game screen IM such as shown by examples presented in FIG. 4 and FIG. 5 and can perform the same processing as in the first embodiment.

According to the above-described game control program, game system, and game control method of the seventh embodiment, the reference line KL, the instruction path R, and the cursor KG that is operated by a specific operation are displayed on the touch panel 10, an operation in which an instructor makes direct contact with the cursor KG and moves on the reference line KL while maintaining contact is recognized as a specific operation, a judgment is made of whether or not the specific operation responsive to the change in the position of intersection between the reference line KL and the instruction path R, and this is reflected in the game results, thereby enabling a heightening of interest in the game.

Eighth Embodiment

Figure 18:
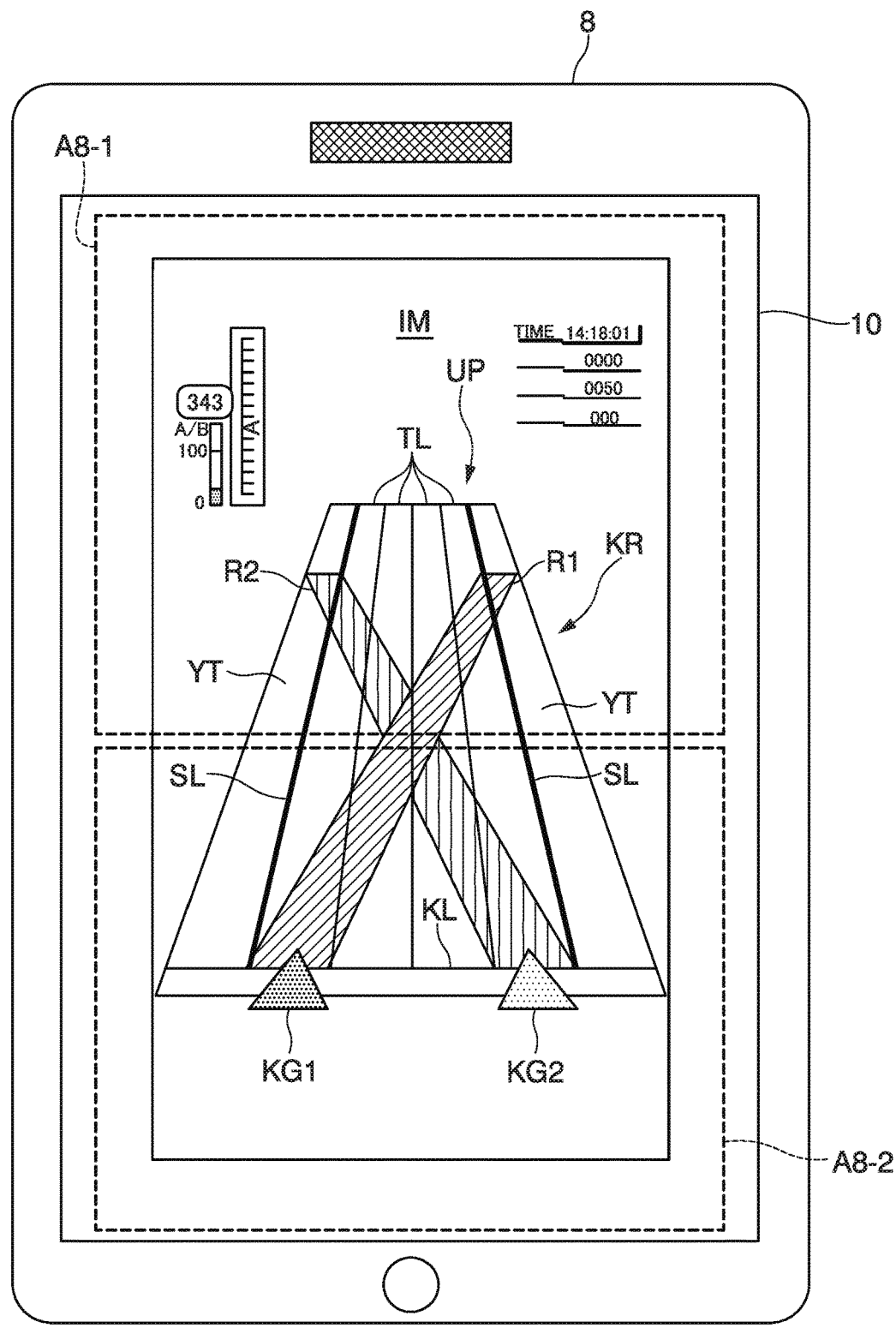
FIG. 18 shows an example of the sensing area of the eighth embodiment that accepts various operations including a specific operation.
Figure 19:
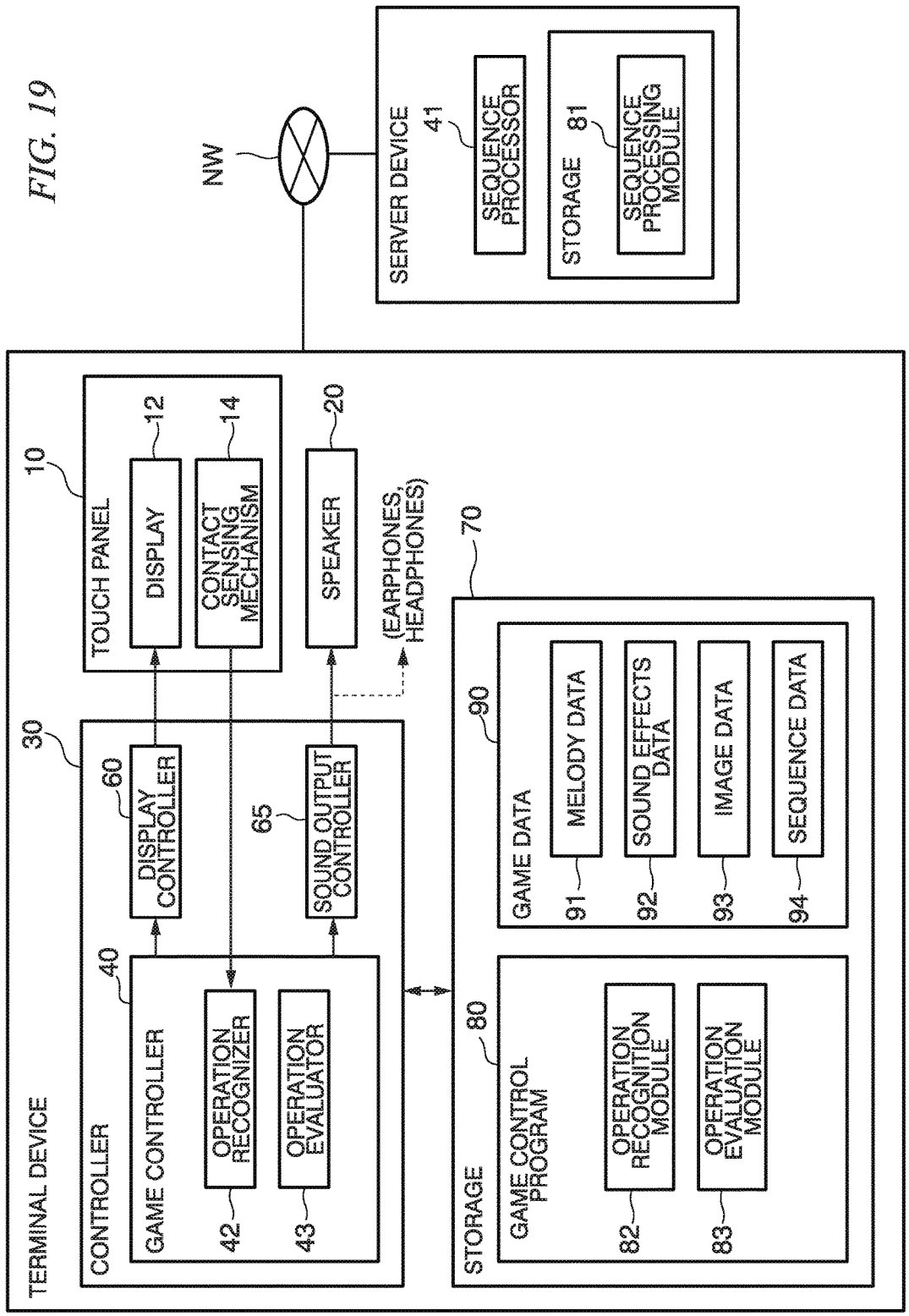
FIG. 19 shows another example of the functional configuration of the game system.

A game system 8 according to the eighth embodiment will now be described. With the exception of the differences that are described below, the functional elements (refer to FIG. 6) and processing details of the various constituent elements of the game system 8 according to the eighth embodiment are the same as in the first embodiment. FIG. 18 shows an example of the sensing area of the eighth embodiment that accepts various operations including a specific operation.

In the present embodiment, of the overall sensing area of the touch panel 10 is divided into top and bottom sensing areas, with the center part in the vertical direction thereof as the base line. The game system 8 of the eighth embodiment recognizes an operation with respect to the area A8-1 as an operation required when an object OJ or a large object DJ has reached the reference line KL and recognizes an operation with respect to the area A8-2 as a specific operation. Although the overall sensing surface of the touch panel 10 in the present embodiment is divided substantially uniformly up and down, the division is not restricted to being substantially uniform. For example, the sensing area A8-1 may be made larger or smaller than the sensing area A8-2. It is not necessary that the overall sensing surface be used for the sensing areas, which can, of coarse, be a part of the sensing surface. The broken lines indicating the sensing areas A8-1 and A8-2 in FIG. 18 are not actually displayed on the game screen IM, but may be displayed thereon and, if they are displayed, it is possible for the user to easily recognize each sensing area.

For example, if the sensing area A8-1 is tapped by an instructor, the same result occurs as if a large button LS(1) to LS(4) is operated, as has been described regarding the first embodiment. If an instructor makes contact with the sensing area A8-1 for at least a prescribed time, the same result occurs as if a small button SS(1) or SS(2) is operated, as was described regarding the first embodiment. When this happens, the operation recognizer 42 according to the eighth embodiment, based on the relationship of the position of an object near the reference line KL and the position at which the operation was made, judges whether or not the operation was made with respect to the object.

In contrast, during the time in which an instructor makes contact with the sensing area A8-2, if the cursor is, for example, movement to the right and then the instructor is removed from the sensing area A8-2, the cursor KG is moved, for example, to the left.

If a flick operation is made in the sensing area A8-2, the cursor KG moves at high speed. This relationship may be reversed. That is, an operation with respect to the sensing area A8-1 may be recognized as a specific operation, and an operation with respect to the sensing area A8-2 may be recognized as an operation required when an object OJ or a large object DJ reaches the reference line KL.

In this manner, the present embodiment has been described as an example of a configuration in which the relationship of an operation to be recognized individually for each sensing area and objects and an instruction path is pre-established.

According to the above-described game control program, game system, and game control method of the eighth embodiment the reference line KL, an instruction path R, and a cursor KG operated by a specific operation are displayed on the touch panel 10 and, if an instructor makes contact with the sensing area A8-2 of the touch panel 10 for at least a prescribed time, that operation is recognized as a specific operation, a judgment is made of whether or not the specific operation responsive to the change in the position of intersection between the reference line KL and the instruction path R, and this is reflected in the game results, thereby enabling a heightening of interest in the game.

According to the game control program, the game system, and the game control method of the eighth embodiment, because a specific operation is made by continuously touching one point, there is no need to allocate a large sensing surface. Therefore, the game system or the like according to the eighth embodiment is preferably applied to a device having a relatively small sensing surface to sense operations, such as a mobile telephone or table terminal. The game system or the like according to the eighth embodiment is not restricted to these, and can be applied to an enclosure installed in an amusement facility such as a game center.

According to the game control program, the game system, and the game control method of the eighth embodiment, as shown in FIG. 18, an area that accepts a specific operation is provided in a location different from the reference line KL, thereby enabling the user to make operations while visually recognizing whether or not the cursor KG coincides with the position of intersection between the reference line KL and the instruction path R and enabling the provision of a more enjoyable game.

Although the foregoing has been a description of the present invention using embodiments thereof, the present invention is in no way restricted to such embodiments, and can be subjected to various modifications and replacements, within the scope of the spirit of the present invention.

For example, in the game system of the above-described embodiments, a special object may be displayed on the game screen IM and, when the user fails in making an operation when the special object reaches the reference line KL, the relationship of correspondence between the direction of the specific operation and the direction of movement of the cursor KG may be reversed. Taking the example of the third embodiment, when the slider SD5 is moved to the right, the cursor KG1 moves to the left and when the slider SD5 is moved to the left, the cursor KG1 moves to the right. Also, when the slider SD6 is moved to the right, the cursor KG2 moves to the left and when the slider SD6 is moved to the left, the cursor KG2 moves to the right. Because this makes operation significantly more difficult, the user must perform operations taking great care not to fail in making operations with respect to special objects. As a result, it is possible to achieve a game with thrilling outcomes. A special object is one that has, for example, a different form of display (not shown) (such as color, shape, or presentation) from other objects or the instruction path R.

Although in the above-described embodiments, the instruction path information part 94r has been described as having coded therein information of the starting time, information of the position on the reference line KL at the starting time of the instruction path R, information of the ending time, information of the position on the reference line KL at the ending time of the instruction path R, information of the width of the instruction path R, and information of the instruction path pattern, these are not restrictions. For example, in place of, or along with, the information of the stalling time, information of the time (arrival time) of the instruction path R reaching the reference line KL may be coded. If the arrival time information is coded in place of the starting time, in the game progression processing, the display controller 60 identifies the starting time by a back-calculation from the arrival time read out from the instruction path information part 94r and performs control to display on the display 12.

In the above-described embodiments, the game system can be implemented by a standalone computing device. The game system can also be implemented by other configurations. For example, the game system can be implemented by a terminal and a server to which the terminal is accessible through an available network. FIG. 9 shows another example of the configuration of the game system. In this case, the system includes the terminal and the server to which the terminal is accessible through the network NW. The network NW can be implemented by a phone network, a PHS (Personal Handy-Phone) network, a VAN (Virtual Private Network), a dedicated communication network, a WAN (Wide Area Network), a LAN (Local Area Network), a PSTN (Public Switched Telephone Network) and combinations thereof. The server and the terminal are configured to be suitable for the network NW. The server includes the sequence processor 41 and the storage that stores the sequence processing module 81. The terminal device includes the controller 30, the touch panel 10, the storage 70 and the speaker 20. The controller 30 includes the game controller 40, the display controller 60, and the sound output controller 65. The game controller 40 includes the operation recognizer 42 and the operation evaluator 43. The touch panel 10 includes the display 12 and the contact sensing mechanism 14. The storage 70 stores the game control program 80 and the game data 90. The same control program 80 includes the operation recognition module 82 and the operation evaluation module 83. The game data 90 includes the melody data 91, the sound effects data 92, the image data 93, and the sequence data 94.

Figure 20:
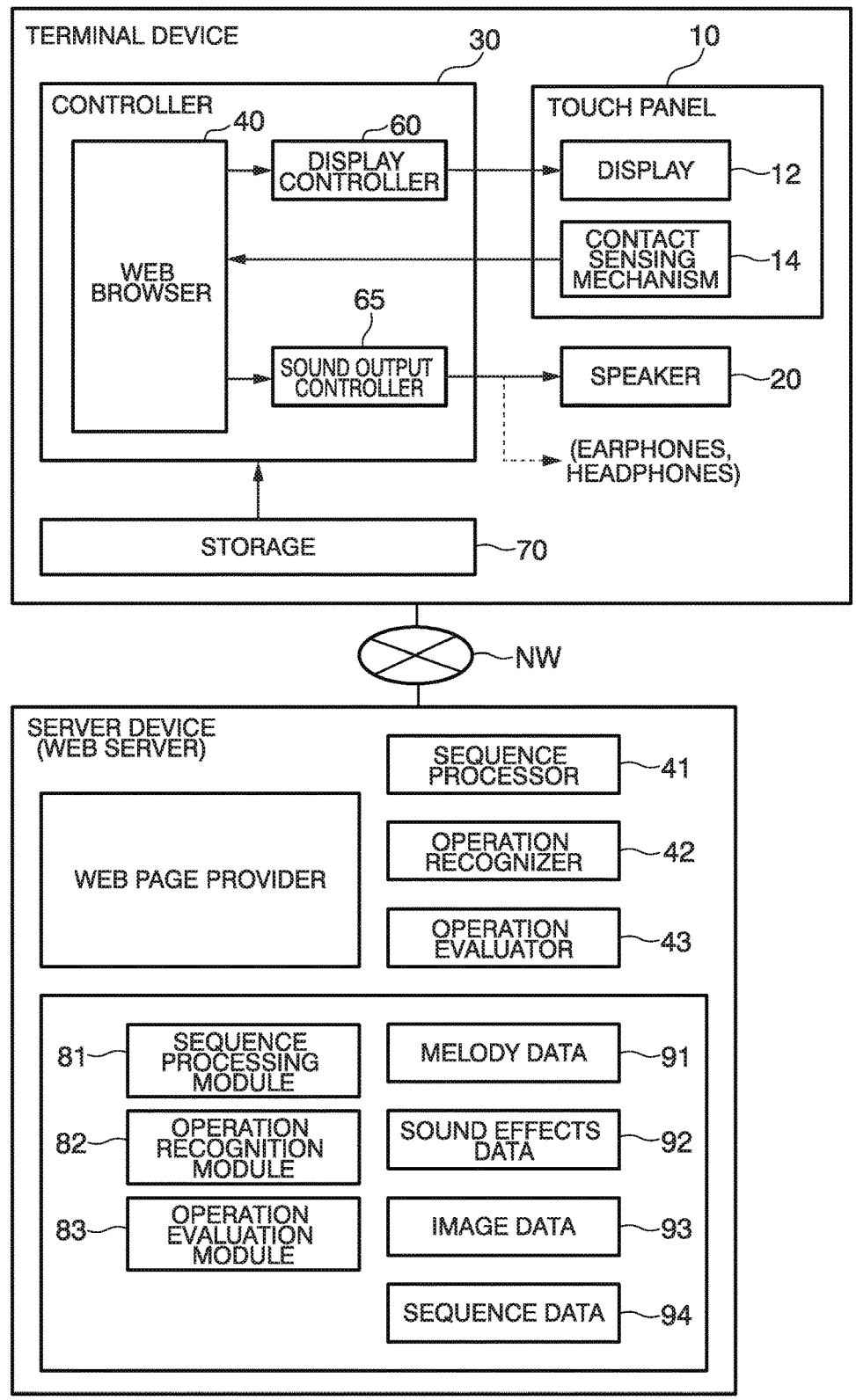
FIG. 20 shows still another example of the functional configuration of the game system.

In other cases, the game system can be implemented by a terminal and a Web-server to which the terminal is accessible through an available network. FIG. 20 shows still another example of the configuration of the game system. In this case, the system includes the terminal and the Web-server to which the terminal is accessible through the network NW. The network NW can be implemented by a phone network, a PHS (Personal Handy-Phone) network, a VAN (Virtual Private Network), a dedicated communication network, a WAN (Wide Area Network), a LAN (Local Area Network), a PSTN (Public Switched Telephone Network) and combinations thereof. The server and the terminal are configured to be suitable for the network NW. The server includes a Web-page provider, the sequence processor 41, the operation recognizer 42, the operation evaluator 43 and the storage. The storage stores the sequence processing module 81, the operation recognition module 82, the operation evaluation module 83, the melody data 91, the sound effects data 92, the image data 93, and the sequence data 94. The terminal device includes the controller 30, the touch panel 10, the storage 70 and the speaker 20. The controller 30 includes the Web-browser 40, the display controller 60, and the sound output controller 65. The touch panel 10 includes the display 12 and the contact sensing mechanism 14.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program axles or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices, in this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks. Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone deuce or other hardware. In another aspect, the means for performing the steps associated with the processes described above may include any of the hardware and/or software described above. All such permutations and combinations are intended to fall within the scope of the present disclosure.

What is claimed is:

1. A game system comprising:
   a display device having a touch screen for displaying a game;
   a detector configured to detect a contact or touch to a detection area of the touch screen of the display device;
   a processor configured to execute a game control program to at least:
      display, on the display device, 1) at least one reference indicator; 2) at least one target indicator; and 3) at least one operation indicator, wherein the at least one target indicator decreases in a distance from the at least one reference indicator as time elapses, and after the at least one target indicator has contacted with the at least one reference indicator, a cross position between the at least one target indicator and the at least one reference indicator changes continuously along an extension direction of the at least one reference indicator, and wherein the at least one operation indicator moves along the extension direction of the at least one reference indicator based on a specific operation to the detection area;
      recognize that the specific operation to the detection area occurs when the detector detected that an instructor is made into a contact or touch to a point in the detection area and that the instructor slides on the touch screen;
      display, on the display device, a guide indicator for guiding the instructor to slide on the detection area of the touch screen in a slide-operational direction;
      determine whether the specific operation is caused by the change of the cross position; and
      reflect a result of the determination to a game result.

2. The game system according to claim 1, wherein the processor is configured to execute the game control program further to:
   divide the detection area into a plurality of virtual divided areas; and
   associate operations on each of the plurality of virtual divided areas with a respective type of operations.

3. The game system according to claim 1, wherein the processor is configured to execute the game control program further to:
   display on the display device the at least one operation indicator corresponding to the cross position when it is determined that the specific operation is caused by the change of the cross position.

4. The game system according to claim 1, wherein determining whether the specific operation is caused by the change of the cross position comprises: determining whether the specific operation is caused by the change of the cross position, on the basis of sequence data of the specific operation, where the sequence data describes contents of the specific operation, and the contents are associated with information specifying operation timing.

5. The game system according to claim 1, wherein determining whether the specific operation responsive to the change of the cross position comprises:
   determining that the specific operation is caused by the change of the cross position when the position of the operation indicator corresponds to the cross position.

6. A game system comprising:
   a display device having a touch screen for displaying a game;
   a detector configured to detect a contact or touch to a detection area of the touch screen of the display device;
   a processor configured to execute a game control program to at least:
      display, on the display device, 1) at least one reference indicator; 2) at least one target indicator; and 3) at least one operation indicator, wherein the at least one target indicator decreases in a distance from the at least one reference indicator as time elapses, and after the at least one target indicator has contacted with the at least one reference indicator, a cross position between the at least one target indicator and the at least one reference indicator changes continuously along an extension direction of the at least one reference indicator, and wherein the at least one operation indicator moves along the extension direction of the at least one reference indicator based on a specific operation to the detection area;
      recognize that the specific operation to the detection area occurs when the detector detected that an instructor has been contacting continuously with a predefined point of the detection area for longer than a period of time;
      display, on the display device, a guide indicator for guiding the instructor to slide on the detection area of the touch screen in a slide-operational direction;
      determine whether the specific operation is caused by the change of the cross position; and
      reflect a result of the determination to a game result.

7. The game system according to claim 6, wherein the processor is configured to execute the game control program further to:
   recognize a first operation to move the at least one operation indicator in a first direction, if the detector detected that the instructor has continuously been contacting with a position of the detection area for longer than the period of time; and
   recognize, as a second operation to move the at least one operation indicator in a second direction, a detected operation that the instructor has no longer contacted with the predefined position of the detection area after the instructor has continuously contacted.

8. The game system according to claim 7, wherein the processor is configured to execute the game control program further to:
   recognize, as a third operation to move the at least one operation indicator faster than the first operation, a detected series of operations that the instructor gets contact with a predefined point of the detection area, before on the detection area the instructor slides while keeping the indicator in contact with the detection area.

9. The game system according to claim 6, wherein the processor is configured to execute the game control program further to:

divide the detection area into a plurality of virtual divided areas; and associate operations on each of the plurality of virtual divided areas with a respective type of operations.

10. The game system according to claim 6, wherein the processor is configured to execute the game control program further to:

display on the display device the at least one operation indicator corresponding to the cross position when it is determined that the specific operation is caused by the change of the cross position.

11. The game system according to claim 6, wherein determining whether the specific operation is caused by the change of the cross position comprises: determining whether the specific operation is caused by the change of the cross position, on the basis of sequence data of the specific operation, where the sequence data describes contents of the specific operation, and the contents are associated with information specifying operation timing.

12. The game system according to claim 6, wherein determining whether the specific operation responsive to the change of the cross position comprises:

determining that the specific operation is caused by the change of the cross position when the position of the operation indicator corresponds to the cross position.

13. A game system comprising:

a display device having a touch screen for displaying a game;

a detector configured to detect a contact or touch to a detection area of the touch screen of the display device;

a processor configured to execute a game control program to at least:

display, on the display device, 1) at least one reference indicator; 2) at least one target indicator; and 3) at least one operation indicator, wherein the at least one target indicator decreases in a distance from the at least one reference indicator as time elapses, and after the at least one target indicator has contacted with the at least one reference indicator, a cross position between the at least one target indicator and the at least one reference indicator changes continuously along an extension direction of the at least one reference indicator, and wherein the at least one operation indicator moves along the extension direction of the at least one reference indicator based on a specific operation to the detection area;

recognize that the specific operation to the detection area occurs when the detector detected that an instructor has been following to and contacting with the cross position;

display, on the display device, a guide indicator for guiding the instructor to slide on the detection area of the touch screen in a slide-operational direction;

determine whether the specific operation is caused by the change of the cross position; and change a position of the at least one reference indicator over the game screen on the basis of a game result.

14. The game system according to claim 13, wherein the processor is configured to execute the game control program further to:

divide the detection area into a plurality of virtual divided areas; and associate operations on each of the plurality of virtual divided areas with a respective type of operations.

15. The game system according to claim 13, wherein the processor is configured to execute the game control program further to:

display on the display device the at least one operation indicator corresponding to the cross position when it is determined that the specific operation is caused by the change of the cross position.

16. The game system according to claim 13, wherein determining whether the specific operation, the change of the cross position comprises: determining whether the specific operation is caused by the change of the cross position, on the basis of sequence data of the specific operation, where the sequence data describes contents of the specific operation, and the contents are associated with information specifying operation timing.

17. The game system according to claim 13, wherein determining whether the specific operation responsive to the change of the cross position comprises:

determining that the specific operation is caused by the change of the cross position when the position of the operation indicator corresponds to the cross position.

* * * * *